US009924389B2

(12) United States Patent
Siomina et al.

(10) Patent No.: US 9,924,389 B2
(45) Date of Patent: Mar. 20, 2018

(54) VERIFICATION IN A WIRELESS COMMUNICATION SYSTEM

(71) Applicant: Telefonaktiebolaget L M Ericsson (publ), Stockholm (SE)

(72) Inventors: Iana Siomina, Solna (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 691 days.

(21) Appl. No.: 13/997,735

(22) PCT Filed: Mar. 12, 2013

(86) PCT No.: PCT/SE2013/050220
§ 371 (c)(1),
(2) Date: Jun. 25, 2013

(87) PCT Pub. No.: WO2013/137806
PCT Pub. Date: Sep. 19, 2013

(65) Prior Publication Data
US 2014/0056165 A1 Feb. 27, 2014

Related U.S. Application Data

(60) Provisional application No. 61/611,425, filed on Mar. 15, 2012.

(51) Int. Cl.
| G01R 31/08 | (2006.01) |
| H04B 7/185 | (2006.01) |
| H04W 24/08 | (2009.01) |
| H04B 1/7083 | (2011.01) |
| H04J 11/00 | (2006.01) |

(52) U.S. Cl.
CPC .......... *H04W 24/08* (2013.01); *H04B 1/7083* (2013.01); *H04J 11/0086* (2013.01)

(58) Field of Classification Search
CPC .............................. H04B 7/212; H04L 12/26
USPC ....... 370/328–331, 252, 351, 503, 508, 509, 370/510, 518, 519, 468, 395.21, 324, 350; 455/69, 452.2, 422.1, 434, 450–453, 509, 455/522
See application file for complete search history.

(56) References Cited

U.S. PATENT DOCUMENTS

| 5,613,219 A * | 3/1997 | Vogel et al. ..................... 455/78 |
| 7,990,910 B2 * | 8/2011 | Watanabe ...................... 370/324 |
| 8,194,558 B2 * | 6/2012 | Choi et al. ..................... 370/252 |

(Continued)

FOREIGN PATENT DOCUMENTS

EP    2187553 A1    5/2010

*Primary Examiner* — Hanh N Nguyen
(74) *Attorney, Agent, or Firm* — Coats & Bennett, PLLC

(57) ABSTRACT

A method implemented by a node in a wireless communication system comprises obtaining (120) a result of a timing measurement performed on one or more first radio signals associated with one or more specific characteristics. The method also includes verifying (130) one or more second radio signals as associated with the one or more specific characteristics, by determining whether the result meets one or more conditions. In some embodiments, the one or more specific characteristics is an identity of a specific radio node or cell. Moreover, in one or more embodiments, the result of the timing measurement is used for verification in this way instead of or in addition to the result of a power-based measurement.

29 Claims, 12 Drawing Sheets

(56) References Cited

U.S. PATENT DOCUMENTS

| | | | |
|---|---|---|---|
| 8,493,890 B2* | 7/2013 | Wu et al. | 370/255 |
| 2011/0148709 A1* | 6/2011 | Davis et al. | 342/387 |
| 2012/0044928 A1 | 2/2012 | Bhattad et al. | |
| 2012/0269172 A1* | 10/2012 | Chin et al. | 370/332 |

* cited by examiner

VERIFICATION IN A WIRELESS COMMUNICATION SYSTEM

RELATED APPLICATIONS

The present application claims priority to U.S. Provisional Patent Application No. 61/611,425, which was filed Mar. 15, 2012 and is incorporated by reference in its entirety herein.

TECHNICAL FIELD

The present invention generally relates to a wireless communication system, and particularly relates to methods and apparatus for verification in such a system.

BACKGROUND

In a cellular network, user equipment (UE) perform cell search and cell identification for the purpose of mobility, radio resource management (RRM), etc. Cell search and cell identification may also be performed by a radio network node equipped with the corresponding interface, e.g., a femto eNodeB operating in a listening mode. In a more general case, not restricted to cellular networks, a wireless device or a radio node performs a search of neighbour wireless devices or radio nodes, e.g., a Bluetooth device, a laptop with a radio interface activated, another mobile, an iPhone, a WiFi node, neighbour radio nodes, etc. Accordingly, identification of a radio node or cell may be performed in a cellular network, an ad hoc network, a sensor network, a WiFi network, etc.

From the perspective of a UE in a 3GPP cellular network, a UE finds a cell by receiving radio signals and searching for signals with a specific signature known to the UE. To identify a new cell, the UE has to identify the cell (e.g., with a non-globally unique identity) and then, optionally or upon a request, obtain a globally unique Cell Global Identity (CGI).

In Long Term Evolution (LTE) networks, cell identification includes detection of a cell and then additionally performing verification. For example, a UE detects a specific physical-layer cell identity (PCI) and then verifies that the specific PCI was actually detected, as opposed to being detected in error.

Cell detection in LTE is performed based on synchronization signals; specifically, based on a Primary Synchronization Signal (PSS) and a Secondary Synchronization Signal (SSS). The synchronization signals occupy 62 resource elements in the center of the allocated bandwidth as shown in FIGS. 1 and 2. In a synchronous network, PSS/SSS from one cell overlap/interferer with PSS/SSS from another cell, which correspond to reuse-1 or 100% load all the time on these signals.

Unique combinations of PSS and SSS provide 504 unique PCIs, which may be reused in the same PLMN network on one frequency and/or across frequencies. These PCIs are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. The cell identity group is determined based on the known SSS sequences, and the identity within the group is determined based on the known PSS sequences.

The PCI of a detected cell can then be used to determine sequences of other signals (e.g., cell-specific reference signals, CRS, positioning reference signals, PRS, etc.) and their allocation in the time-frequency grid. The CRS signals in LTE are allocated in the time-frequency grid as shown in FIG. 3. Different cells can use 6 different shifts in frequency. In practice, there is a reuse-6 pattern for CRS transmitted from 1 TX antenna ports and reuse-3 pattern for CRS transmitted from 2 TX antenna ports.

With the CRS determined in this way, the detected cell is verified by performing a signal strength measurement (e.g., a reference signal received power (RSRP) measurement) on that CRS.

After identifying the cell, the UE may be requested by the associated eNodeB to report the CGI of the cell. The request may be triggered by the eNodeB receiving a measurement report for the identified cell from the UE. That is, the CGI reading request may follow the reporting of the newly identified cell (where the newly identified cell is detected and verified by RSRP measurement). Regardless, the CGI may be obtained via reading system information transmitted over a broadcast channel.

Consider now cell identification in the context of a multi-carrier system that permits carrier aggregation (CA). A multi-carrier system (or interchangeably called as the CA) allows the UE to simultaneously receive and/or transmit data over more than one carrier frequency. Each carrier frequency is often referred to as a component carrier (CC) or simply a serving cell in the serving sector, more specifically a primary serving cell (PCell) or secondary serving cell (SCell). The multi-carrier concept is used in both High Speed Packet Access (HSPA) and LTE. Carrier aggregation is supported for both contiguous and non-contiguous component carriers, and component carriers originating from the same eNodeB need not to provide the same coverage.

Serving Cell: For a UE in RRC_CONNECTED not configured with CA there is only one serving cell comprising of the primary cell (PCell). For a UE in RRC_CONNECTED configured with CA the term 'serving cells' is used to denote the set of one or more cells comprising of the primary cell and all secondary cells.

Primary Cell (PCell): the cell, operating on the primary frequency, in which the UE either performs the initial connection establishment procedure or initiates the connection re-establishment procedure, or the cell indicated as the primary cell in the handover procedure.

Secondary Cell (SCell): a cell, operating on a secondary frequency, which may be configured once an RRC connection is established and which may be used to provide additional radio resources.

In the downlink, the carrier corresponding to the PCell is the Downlink Primary Component Carrier (DL PCC) while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

Activation and deactivation of secondary cells: In CA, the base station (e.g. eNode B) in LTE can deactivate one or more secondary cells on the corresponding secondary carriers. The deactivation is done by the eNB using lower layer signalling (e.g. over PDCCH in LTE) using a short command such as ON/OFF (e.g. using 1 bit for each SCell). The activation/deactivation command is sent to the UE via the PCell. Typically the deactivation is done when there is no data to transmit on the SCell(s). The activation/deactivation can be done independently on uplink and downlink SCell. The purpose of the deactivation is thus to enable UE battery saving. The deactivated SCell(s) can be activated also by the same lower layer signalling.

In this context, cell identification may generally be performed via intra-frequency measurements (i.e., measurements on the frequency of a serving cell, whether PCell or SCell), inter-frequency (i.e., measurements on a frequency different than that of a serving cell), or inter-RAT measurements (i.e., measurements on a radio access technology, RAT, different than that of a serving cell). Inter-frequency and inter-RAT measurements may also be inter-band when the frequencies belong to different frequency bands.

In this context, the non-CA UE would normally require measurement gaps for performing inter-frequency or inter-RAT cell identification. The same applies for CA-capable UE when performing cell identification on non-configured or deactivated carrier. CA-capable UE would, however, normally not require measurement gaps for measurements on SCC. There is also an on-going discussion in 3GPP on non-CA capable UE which are capable of performing measurements without measurement gaps. Thus, a UE may not require measurement gaps for performing measurements on a configured carrier component.

Cell identification may also be performed during specifically configured low-interference time periods, e.g., indicated by a time-domain measurement resource restriction pattern which the network may signal to the UE to facilitate enhanced Inter-Cell Interference Coordination (eICIC) in heterogeneous deployments. It is, however, noted that such measurement patterns do not help to improve the interference situation on PSS/SSS in a synchronous network or frame-aligned network where PSS/SSS always experience 100% load since these signals are always transmitted in all cells. The patterns may, however, be useful for improving RSRP accuracy or RSRQ level which may differ in different subframes and thus the network may indicate to the measuring UE the subframes with the preferred interference conditions.

Also note that the current cell identification requirements specify a certain period T during which the UE has to perform cell identification and report a corresponding event to the network. The required period T includes both the time necessary for detecting a cell and the time T1 for performing a measurement. The current standard specifies both T and T1 time periods. Further, the UE is typically required to report N (e.g., N=8) identified cells within the required period. The requirements for cell identification typically differ (e.g., in the measurement period length, number of cells, number of frequencies, etc.) for intra-frequency, inter-frequency, and inter-RAT.

Cell identification proves similar in networks other than LTE. In WCDMA, for example, the UE detects a cell using signals transmitted on primary and secondary synchronization channel, as well as CPICH scrambling code detection. The UE then verifies the cell using signal strength measurements, called Received Signal Code Power (RSCP). In GSM, the UE reads a broadcast channel (BSIC) as "cell search" (the UE knows the frequency, so it only needs to find the broadcast channel), performs a received-signal level measurement, RXlev (RSSI), which is then reported.

In other systems, such as those based on machine-to-machine (M2M) and device-to-device (D2D) communication, identification of other radio nodes or devices also proceeds in a similar fashion. For example, in D2D communication there is also some sort of device discovery and device verification. In network-assisted D2D, the network gives sufficient information to a slave in order to be able to detect a master, for instance the beacon signal to search for, time-frequency resources to find the beacon, etc. The verification is then mainly done by determining the reliability of the detected signal. If it is reliable that the specific beacon has been detected, then it has been verified. Sometimes the verification information is also fed back to the network node (including for instance received beacon power level, etc.) for further D2D mode selection by the network node.

Accordingly, whether in the context of node/cell identification or in some other context, verification in a wireless communication system has heretofore exclusively relied upon the result of a power-based measurement.

SUMMARY

Several problems have been identified with previous techniques for performing verification in a wireless communication system. First, performing verification exclusively using the result of a power-based measurement proves slower and less accurate/reliable than desired in at least some circumstances. Second, performing verification using the result of a power-based measurement proves more complex and resource-consuming than desired in some circumstances, e.g., when the measurement is performed on a power-controlled signal or when the measurement is done in the frequency domain.

One or more embodiments herein address these issues by performing verification using the result of a timing measurement, instead of or in addition to the result of a power-based measurement. Verification performed in this way proves faster, more accurate/reliable, less complex, and/or more resource-efficient than verification performed exclusively using the result of a power-based measurement. Moreover, in the context of positioning, verification performed using the result of a timing measurement enhances that positioning (e.g., by improving distance estimation and/or decreasing positioning uncertainty and/or decreasing the uncertainty or increasing the confidence, or both, of the measurement used for position calculation).

Broadly, though, embodiments herein include a method implemented by a node in a wireless communication system. The method includes obtaining a result of a timing measurement performed on one or more first radio signals associated with one or more specific characteristics. The method then includes verifying one or more second radio signals as associated with the one or more specific characteristics, by determining whether that result meets one or more conditions.

In at least some embodiments, a first radio signal is the same as a second radio signal. In other embodiments, a first radio signal differs from a second radio signal, at least in the sense that a first radio signal is a different type or version of radio signal than a second radio signal.

In some embodiments, the one or more specific characteristics comprise at least an identity of a specific transmitter, radio node, or cell. In some other embodiments, the one or more specific characteristic comprise at least one of a code or parameter used for generating the one or more second radio signals.

In one or more embodiments, the node is a first wireless device and a second wireless device transmits the one or more first radio signals.

In one or more embodiments, determining whether the result meets one or more conditions comprises determining that the result meets the one or more conditions when one or more of: (1) the result is less than a defined maximum timing threshold, greater than a defined minimum timing threshold, or both; and (2) the result corresponds to a distance that is less than a defined maximum distance threshold, greater than a defined minimum distance threshold, or both.

In one or more other embodiments, determining whether the result meets one or more conditions comprises determining that the result meets the one or more conditions when one or more of: (1) the result is determined within a defined time window; and (2) the result is a specific time instant relative to a timing of another signal, or relative to an absolute timing instant.

In some embodiments, the timing measurement comprises one or more of: (1) a measurement of a time of arrival or time difference of arrival of the one or more first radio signals; (2) a measurement of a timing advance associated with the one or more first radio signals; (3) a measurement of a round trip time or propagation delay associated with the one or more first radio signals; and (4) a correlation of the one or more first radio signals to one or more known signals. In this case, determining whether the result meets one or more conditions in some embodiments comprises determining that the result meets the one or more conditions when the result has at least a defined accuracy, reliability, quality, or any combination thereof.

In one or more embodiments, the one or more first radio signals comprise one or more reference signals.

Alternatively or additionally, the one or more second radio signals in some embodiments comprise one or more synchronization signals.

In some embodiments, the method further includes obtaining a result of a power-based measurement, and verifying the one or more second radio signals as associated with the one or more specific characteristics by determining whether both the result of the timing measurement meets the one or more conditions and the result of the power-based measurement meets one or more other conditions In some embodiments, the method further includes selecting, from among a plurality of different types of measurements possible for performing verification, the timing measurement as being the type of measurement with the greatest accuracy, with the greatest speed, with the lowest resource consumption, or any combination thereof.

In some embodiments, verification is performed as part of identifying a radio node or a cell from which the one or more second radio signal are transmitted. Alternatively or additionally, verification in some embodiments is performed as part of determining the position of a radio node that transmitted or received the one or more second radio signals.

In at least some embodiments, the method further includes signaling to another node a capability associated with an ability of the node to use a timing measurement for verification.

Embodiments herein also include a method implemented by a network node in a wireless communication system. The method comprises determining one or more conditions that a result of a timing measurement performed on one or more first radio signals associated with one or more specific characteristics must meet in order to verify one or more second radio signals as associated with the one or more specific characteristics. The method then includes configuring a node in the wireless communication system to perform that verification in accordance with the one or more conditions.

In some embodiments, determining the one or more conditions comprises determining a defined maximum timing or distance threshold, a defined minimum timing or distance threshold, or both.

In some other embodiments, determining the one or more conditions comprises determining a defined time window within which said result must be determined.

In yet other embodiments, determining the one or more conditions comprises determining a defined accuracy, reliability, quality, or any combination thereof with which said result must be determined.

In one or more embodiments, configuring the node is performed responsive to receiving a capability associated with an ability of the node to perform verification based on a timing measurement.

Embodiments herein further include a node in a wireless communication system. The node comprises one or more communication interfaces configured to communicatively couple the node to the system. The node further comprises one or more processing circuits configured to implement any of the methods described above.

Embodiments herein further include a computer program product. The product is stored on a computer readable medium and comprises program code that, when executed by a node in a wireless communication system, cause the node to implement any of the methods described above.

DETAILED DESCRIPTION

Given the interference, noise, and other impairments present in a wireless communication system, there often exists at least some uncertainty about whether a signal is properly detected as associated with one or more specific characteristics (i.e., that the signal truly exists and is truly associated with the one or more specific characteristics). For example, uncertainty often exists about whether a signal detected as associated with the identity of a specific radio node or cell is actually associated with that identity. That uncertainty threatens to jeopardize the ultimate purpose for which the identity will be used, whether that purpose is mobility, radio resource management, positioning, device discovery, etc. In this and other examples, performing verification to verify (i.e., check the truth of) a signal as associated with one or more specific characteristics proves effective in reducing uncertainty and accomplishing the ultimate purpose for which the characteristic will be used.

One or more embodiments herein advantageously employ the result of a timing measurement for performing verification, instead of or in addition to the result of a power-based measurement. As described more fully below, a timing measurement in this regard is any measurement of the timing with which a signal is transmitted by or received from a wireless node, in absolute or relative terms. Whether performed as part of cell/node identification, positioning, or otherwise, performing verification using the result of a timing measurement proves faster, more accurate, less complex, and/or more resource-efficient in at least some circumstances than verification using only the result of a power-based measurement.

Figure 1:
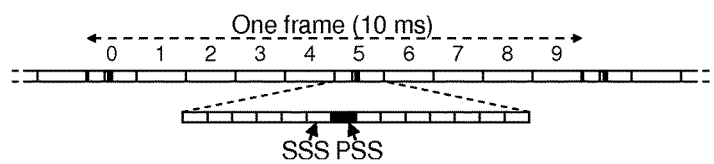
FIG. 1 illustrates the location of a Primary Synchronization Signal (PSS) and a Secondary Synchronization Signal (SSS) in the radio frame of an LTE system.
Figure 2:
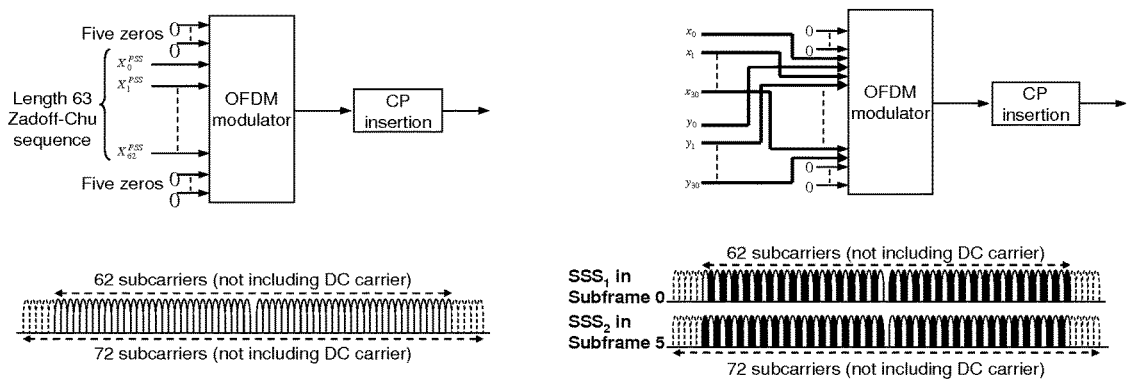
FIG. 2 illustrates the location of a PSS and a SSS in the allocated bandwidth of an LTE system.
Figure 3:
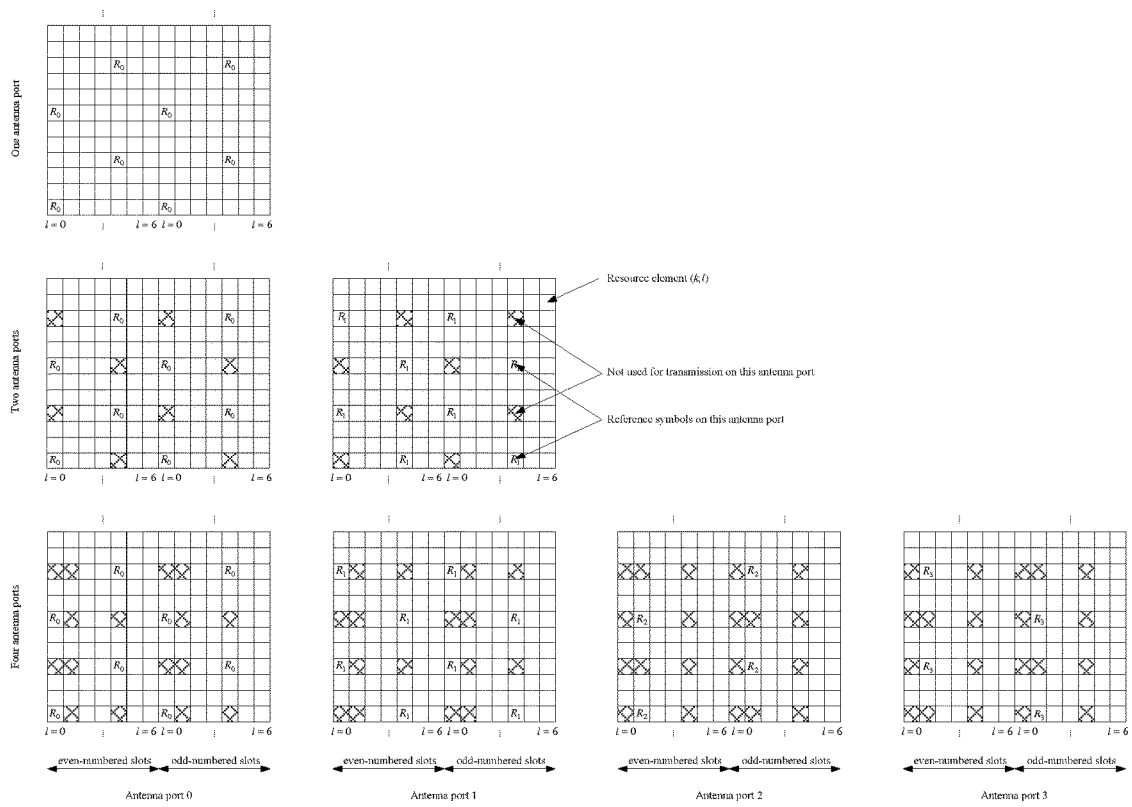
FIG. 3 illustrates the allocation of cell-specific reference signals (CRSs) in the time-frequency grid of an LTE system.
Figure 4:
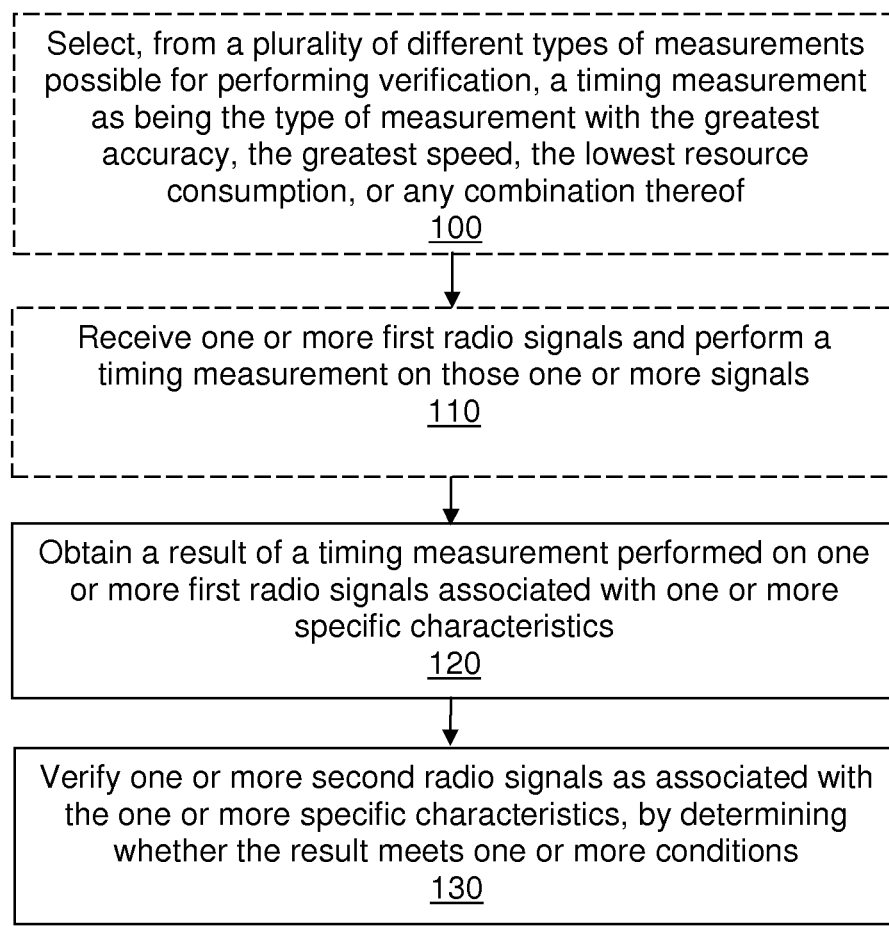
FIG. 4 is a logic flow diagram of a method implemented by a node in a wireless communication system according to one or more embodiments.

Accordingly, one or more embodiments herein broadly include a method implemented by a node in a wireless communication system. The method, as shown in FIG. 4, includes obtaining the result of a timing measurement performed on one or more first radio signals associated with one or more specific characteristics (Block 120). The method then entails verifying one or more second radio signals as associated with the one or more specific characteristics, by determining whether that result meets one or more conditions (Block 130). Verifying in this sense means checking whether it is true that the one or more second radio signals are associated with the one or more specific characteristics, and this checking entails determining whether the result meets one or more conditions. The result meeting those one or more conditions means that the one or more second radio signals are considered as verified (e.g., the one or more second radio signals truly exist within range and are truly associated with the one or more specific characteristics). Conversely, the result not meeting those one or more conditions means that the one or more second radio signals are considered as not verified.

Note that in some embodiments the method in FIG. 4 is implemented by the same node that receives the one or more first radio signals and that performs the timing measurement on those one or more signals. In other embodiments, though, the method is implemented by a node in the system other than the node that receives the one or more first radio signals and that performs the timing measurement on those one or more signals. In these other embodiments, therefore, obtaining the result of such timing measurement simply entails receiving that result from the node that actually performed the timing measurement, perhaps via one or more intermediate nodes. Accordingly, FIG. 4 shows that the method implemented by the node that performs the verification (referred to as the verifying node) may or may not actually include receiving the one or more first radio signals and performing a timing measurement on those one or more signals (Block 110). In at least some embodiments, the one or more second radio signals are detected as associated with the one or more specific characteristics prior to steps 120 and 130 in FIG. 4. Despite that detection, an unacceptable level of uncertainty still remains about whether that detection was in error (e.g., whether the one or more second radio signals truly exist and/or whether the one or more second radio signals are truly associated with the one or more specific characteristics). Correspondingly, steps 120 and 130 in FIG. 4 are performed in order to verify (i.e., check the truth of) the one or more second radio signals as associated with the one or more specific characteristics. In one or more embodiments, this means verifying the one or more second radio signals were correctly detected.

In other embodiments, by contrast, the one or more second radio signals are detected as associated with the one or more specific characteristics only after steps 120 and 130 in FIG. 4. That is, verification is simply performed in advance of detection so as to pre-verify one or more second signals later detected as associated with the one or more specific characteristics. In some embodiments, verification performed in advance of detection entails performing verification of a plurality of different known signals that might be subsequently detected. For example, pre-verification may be performed for a plurality of known radio node or cell identities defined by a rule or provided in a list from a network, followed by detection of at least one of those radio node or cell identities. Whether performed before or after detection, though, verification herein still amounts to verifying one or more signals as associated with one or more specific characteristics.

In at least some embodiments, a "first radio signal" is the same as a "second radio signal". In this case, the method verifies one or more radio signals as associated with one or more specific characteristics, by determining whether the result of a timing measurement performed on those same one or more radio signals meets one or more conditions. For example, after the one or more radio signals are detected, a timing measurement is performed on those one or more radio signals and the method verifies the one or more radio signals as associated with the one or more specific characteristics by determining whether a result of that timing measurement meets the one or more conditions.

In some embodiments, for instance, the result of the timing measurement meets the one or more conditions when the result is less than a defined maximum timing threshold, greater than a defined minimum threshold, or both. The maximum timing threshold may reflect a maximum coverage range of the one or more radio signals, while the minimum timing threshold reflects a minimum coverage range of the one or more radio signals. In an alternative but functionally equivalent implementation, the result meets the one or more conditions when the result corresponds to a distance that is less than a defined maximum distance threshold, greater than a defined minimum distance threshold, or both. Again, these maximum and minimum distance thresholds in some embodiments respectively reflect the maximum and minimum coverage range of the one or more radio signals. In either implementation, the result of the timing measurement meeting the one or more conditions means that the one or more radio signals actually exist within range. This reduces uncertainty about whether those signals were or will be correctly detected, so that the signals can be deemed verified as associated with the one or more specific characteristics.

Analogously, in some other embodiments, the result of the timing measurement meets the one or more conditions when the result is determined within a defined time window. That is, the result is determined within a range around an expected value, where the range allows at least some limited uncertainty in the result. Thus, the verification reduces uncertainty about the one or more signals to some non-zero but acceptable level. In one example, the defined time window comprises a search window [Tmin, Tmax] centered at an expected value for the result (e.g., T0 representing an expected arrival time, which is the time when samples are taken).

In still other embodiments that are less forgiving in terms of uncertainty reduction, the result of the timing measurement meets the one or more conditions when the result is a specific time instant relative to the timing of a another signal, or relative to an absolute timing instant. In yet other embodiments, the result meets the one or more conditions when the result has at least a defined accuracy, reliability, quality, or any combination thereof (e.g., the measurement sample standard deviation, uncertainty, or error is below a defined threshold).

In other embodiments, by contrast, a "first radio signal" differs from a "second radio signal", at least in the sense that a "first radio signal" is a different type or version of radio signal than a "second radio signal". In this case, the method verifies one or more signals as associated with one or more specific characteristics, by determining whether the result of a timing measurement performed on one or more different signals associated with the one or more specific characteristics meets one or more conditions. For example, after the one or more second radio signals are detected as associated with one or more specific characteristics, the one or more first radio signals are determined from the one or more specific characteristics and a timing measurement is performed on those one or more first radio signals. The method then verifies the one or more second radio signals as associated with the one or more specific characteristics by determining whether a result of that timing measurement meets the one or more conditions.

The one or more conditions used for verification in embodiments where a first radio signal is the same as a second radio signal may also be used in embodiments where a first radio signal differs from a second radio signal. For example, when the result of the timing measurement indicates that the one or more first radio signals actually exist within range, this reduces uncertainty about whether the one or more second radio signals were or will be correctly detected, so that the one or more second signals can be deemed verified as associated with the one or more specific characteristics.

In some embodiments, for example, verification is performed as part of identifying a cell from which the one or more second radio signals are transmitted. In this case, the "one or more specific characteristics" in FIG. 4 comprises at least the identity of a specific cell. That is, the result of a timing measurement performed on one or more first signals associated with a specific cell identity is used in these embodiments to verify one or more second radio signals as associated with that specific cell identity.

Applied in the context of an LTE example, this cell identity is a physical-layer cell identity (PCI), the one or more second radio signals include a primary synchronization signal (PSS) and a secondary synchronization signal (SSS), and the one or more first radio signals include a cell-specific reference signal (CRS). If a PSS/SSS is detected as associated with a specific PCI, the accuracy/reliability of that detection may be jeopardized because the PSS/SSS from different cells overlap/interfere with one another. Accordingly, the specific PCI from the detection is used to determine the corresponding CRS, the signal sequence of which depends on the PCI. Rather than or in addition to verifying the PSS/SSS as associated with the specific PCI using the result of a power-based measurement performed on that CRS, embodiments herein verify the PSS/SSS as associated with the specific PCI using the result of a timing measurement performed on that CRS.

When the PSS/SSS was detected as associated with the specific PCI in error (e.g., the PCI assumption was wrong), then the CRS determined from that specific PCI will not be detectable by and will look like noise to the node performing the timing measurement on the CRS. This means that the timing measurement on that CRS will fail and the result of that failed timing measurement will therefore not meet the one or more conditions.

Verification using the result of a timing measurement performed on CRS proves especially advantageous when the network load is relatively low. This is at least partly because the interference on the CRS is particularly favorable, as compared to the interference on the PSS/SSS, with low network loading. Moreover, although the interference on the CRS becomes similar to that on the PSS/SSS during high network loading, practical networks seldom operate with load higher than 70% in the downlink. Thus, the interference situation is typically better for CRS than for PSS/SSS. Still further, interference conditions may be further improved on CRS by configuring ABS (reduced-power or low activity subframes) in the interfering aggressor cells.

With verification performed as part of cell identification in this way, the verification in some embodiments proves effective for mobility (e.g., neighbor discovery by a radio network node, determining cells for handover purposes, cell switching or carrier switching with carrier aggregation, or intra-frequency, inter-frequency, or inter-RAT handover or cell selection/reselection), radio resource management (e.g., determining neighbor cells, determining aggressor cells), network listening (e.g., by a femto base station), minimization of drive test (MDT) configuration, system information reading (e.g., cell global identity, CGI, reading, femto base station discovery or identification), positioning (e.g., for enhanced cell identity, E-CID, positioning) or any other purpose involving the identity of a cell.

In analogous embodiments, verification is performed as part of identifying a radio node from which the one or more second radio signals are transmitted. In this case, the "one or more specific characteristics" in FIG. 4 comprises at least the identity of a specific radio node. Thus, the result of a timing measurement performed on one or more first signals associated with a specific radio node identity is used in these embodiments to verify one or more second radio signals as associated with that specific radio node identity.

With verification performed as part of radio node identification in this way, the verification in some embodiments proves effective for positioning (e.g., proximity-based positioning, for determining proximity of an aggressor radio node or of a victim radio node, for distance estimation), for neighbor device discovery or proximity detection (e.g., for device to device communication), interference coordination (e.g., detecting aggressor and/or victim radio nodes), or any other purpose involving the identity of a radio node.

In one such embodiment, the radio node identity is the identity of a wireless device, as opposed to the identity of a radio network node. In this case, the one or more first radio signals and the one or more second radio signals are transmitted between different wireless devices, e.g., for device discovery. Alternatively or additionally, the node performing verification is a first wireless device and a second wireless device transmits the one or more first radio signals.

Regardless, although above embodiments describe the "one or more specific characteristics" in FIG. 4 as comprising at least the identity of a cell or radio node, the characteristic in other embodiments may be any logical identity, a code, a group code, a scrambling code, or a parameter. In one embodiment, for example, the one or more characteristics are used for generating the one or more second radio signals being verified. That is, the one or more characteristics are verified as associated with the one or more second radio signals at least in the sense that the one or more characteristics are used for generating those radio signals.

Moreover, although above embodiments focus on the case where one or more signals are verified as associated with one or more specific characteristics using the result of a timing measurement, other signals may be verified using the result of a different type of measurement. That is, verification using a timing measurement may be performed selectively for some signals but not others. Although this selection of the type of measurement on which verification is to be based may be performed by any node in the system, the verifying node in some embodiments itself performs the selection. FIG. 4 illustrates an example of such an embodiment where a timing measurement is selected from among different types of measurements as at least one type of measurement on which verification is to be based.

As shown in FIG. 4, the method at the verifying node in some embodiments includes selecting, from among a plurality of different types of measurements possible for performing verification, a timing measurement as being the type of measurement with the greatest accuracy, with the greatest speed, with the lowest resource consumption, or any combination thereof (Block 100). Selecting the timing measurement as the type of measurement with the greatest speed, for example, proves useful when verification is performed as part of positioning or an emergency session. As another example, selecting the timing measurement as the type of measurement with the lowest resource consumption proves useful when verification is performed by low-cost radio nodes that have limited resources (e.g., in terms of processing and/or power resources) or is performed by any radio node in a low-activity or power-saving state (e.g., DRX or IDLE mode). Finally, selecting the timing measurement as the type of measurement with the greatest accuracy proves useful when verification is performed using a measurement on signal(s) with lower quality (e.g., in high interference situations).

Of course, as suggested above, the timing measurement may not be the only type of measurement on which verification is based. Indeed, in at least some embodiments, the verifying node also obtains the result of a power-based measurement (e.g., received signal strength or received signal quality such as RSRP and RSRQ in LTE), as is conventional. The verifying node then verifies the one or more second radio signals as associated with the one or more specific characteristics by determining whether both the result of the timing measurement meets the one or more conditions and the result of the power-based measurement meets one or more other conditions. Verification may be performed in other embodiments based on both the result of the timing measurement and the result of some other type of measurement (e.g., an angle of arrival, AoA, measurement), based on the results of multiple types of timing measurements, based on the results of multiple timing measurements of the same type, or any combination thereof. Performing verification based on the results of multiple measurements in this way advantageously increases verification reliability, especially when the signals are weak or measurement quality is poor.

In embodiments that perform verification using the result of one or more types of timing measurements, these different types of timing measurements include for instance one-direction single-link timing measurements, one-direction multi-link timing measurements, and two-direction timing measurements. Example one-direction single-link timing measurements include time of arrival, time difference of arrival with respect to a pre-defined reference time, and one-way propagation delay. Example one-direction mutli-link timing measurements include time difference of arrival of signals (with the same or different characteristics) transmitted from two cells or two distributed antenna ports (e.g., RTSD used for OTDOA) or transmitted from one location and received at two different locations (e.g., UL RTOA for UTDOA), SFN-to-SFN time difference, timing measurements with CoMP, timing measurements with carrier aggregation, and timing measurements with a distributed or remote antenna system. Finally, example two-direction timing measurements include timing advance, round trip time, two-way propagation delay, UE Rx-TX time difference, eNodeB Rx-TX time difference, eNodeB Rx-Tx time difference, timing advance type 1 (=(eNodeB Rx-Tx time difference)+(UE RX-TX time difference)), a timing measurement over multifarious links (e.g., forward-link transmitter and reverse-link receiver may be non-collocated), a two-way timing measurement with CoMP, a two-way timing measurement with carrier aggregation, and a timing measurement with a distributed or remote antenna system. The timing measurement may involve correlation preferably (though not limited to) in the time domain of the one or more first radio signals to a reference signal generated based on the one or more specific characteristics, demodulation, etc.

Moreover, the timing measurement(s) may each further be an intra-frequency, inter-frequency, inter-band, inter-RAT, CoMP, or CA measurement. The timing measurement(s) may also be performed on a distributed antenna system (DAS).

Still further, the timing measurement(s) may be performed on the same or different signals/channels, and the signals may be cell-specific, UE specific, or any combination thereof. The signals/channels, depending on the link direction, may be DL or UL, and the measurements may thus be DL, UL, or both. Some non-limiting examples of DL signals/channels are PSS, SSS, CRS, MBSFN reference signals, UE-specific reference signals (DM-RS), CSI reference signals (CSI-RS), positioning reference signals (PRS), and DL control channels. Some examples of UL signals/channels are PRACH, UL control channels, sounding reference signals (SRS), and demodulation reference signals. Accordingly, in at least some embodiments, the one or more first radio signals comprise one or more reference signals. Additionally or alternatively, the one or more second radio signals in some embodiments comprise one or more synchronization signals.

In the case that the timing measurement is a relative measurement, as opposed to an absolute timing measurement, the reference timing may be obtained by a predetermined rule. For example, the reference timing may be derived from one or more of characteristics describing network, space, frequency or time. Here, network may refer to network identity, cell characteristic, or the like. Space may refer to location-related information, tracking area, etc. Frequency may be carrier frequency or band related information. And time may refer to some time characteristic such as frame number, absolute time, relative time, etc.

Alternatively or additionally, reference timing may be determined based on signal characteristics, obtained as another timing measurement (e.g., from memory or triggered by the verification procedure), or pre-determined according to a standard (e.g., SFN0 of the serving cell, a GPS reference time, a GNSS reference, or a UTC reference time).

Alternatively or additionally, reference timing may be obtained from or configured by a remote node (e.g., a network node or another radio node), e.g., via higher-layer signaling (such as in an RRC message) or lower-layer signaling (e.g., rading a unicast/multicast/broadcast radio channel).

Depending on the particular type(s) of timing measurement(s) based on which verification is performed, the one or more conditions that the result of such measurement(s) must meet in order for the one or more second radio signals to be verified as associated with the one or more specific characteristics may be implemented as any number of conditions. In some embodiments, for example, the one or more conditions include the measured signal being reliably detected, the measured channel being demodulated correctly, there being at least one correlation peak above a statically or dynamically configured threshold, the measurement being delivered to higher layers from the physical layer, the measurement quality or uncertainty meeting a certain criteria (e.g., the measurement sample standard deviation or measurement uncertainty or measurement error is below a pre-defined threshold), the timing being determined within a certain time window, the timing being determined at a certain time instant relative to timing of another signal, or relative to an absolute timing instant, and/or the measurement meeting at least one condition/criteria which may be pre-defined or provided in assistance data. In one embodiment, the result reliability, accuracy, or uncertainty is estimated, such as based on standard deviation, variance estimate, another statistical uncertainty measure among multiple samples, or by a pre-defined mapping of environmental/channel conditions for the measurement (e.g., delay spread) to the measurement quality.

Figure 5:
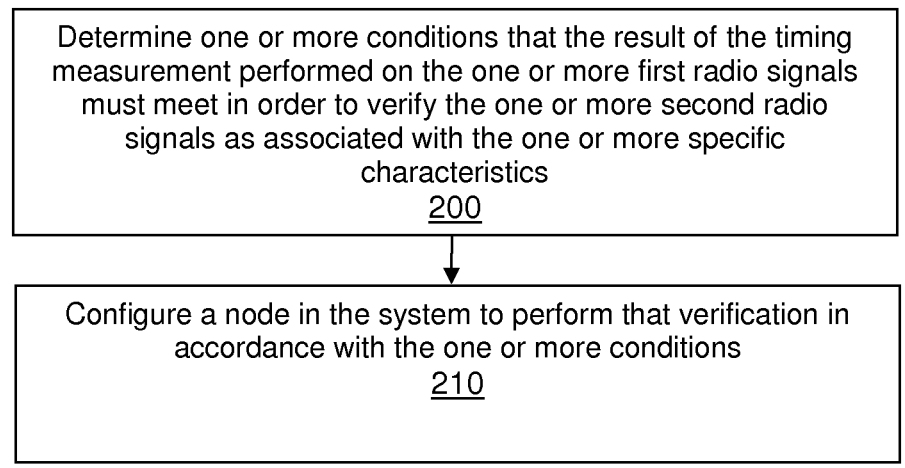
FIG. 5 is a logic flow diagram of a method implemented by a network node in a wireless communication system according to one or more embodiments.

Irrespective of the particular condition(s), though, at least some embodiments herein include a method implemented by a network node in the system for configuring verification to be performed in accordance with those condition(s). FIG. 5 illustrate one example of such a method.

As shown in FIG. 5, the method includes determining one or more conditions that a result of a timing measurement performed on one or more first radio signals associated with one or more specific characteristics must meet in order to verify one or more second radio signals as associated with the one or more specific characteristics (Block 200). The method then includes configuring a node in the system (i.e., the verifying node) to perform that verification in accordance with the one or more conditions (Block 210).

In at least some embodiments, this configuring is performed responsive to receiving a capability associated with an ability of the node to perform verification based on a timing measurement. That is, if the node is capable of performing verification based on a timing measurement, the network node configures the node to do so. Correspondingly, then, embodiments herein further include the node signaling to another node (e.g., the network node above) a capability associated with an ability of the node to perform verification based on a timing measurement.

Figure 6:
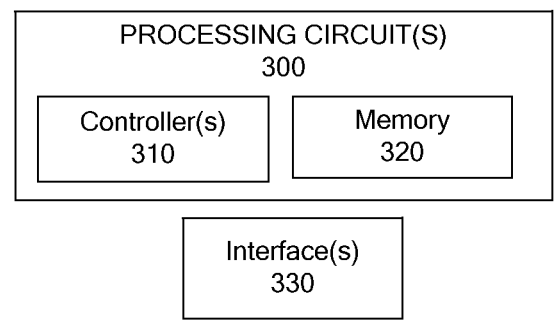
FIG. 6 is a block diagram of a node configured to perform the method of FIG. 4 or 5 according to one or more embodiments.

FIG. 6 illustrates an exemplary node operative to perform the processing shown in FIG. 4 or 5. As shown in FIG. 6, the node includes one or more interfaces 330, and one or more processing circuits 310. The one or more interfaces 330 are configured to communicatively couple the node to the wireless communication system, e.g., via an air interface. The one or more processing circuits 300 are configured to carry out the processing shown in FIG. 4 or 5. The processing circuits 300 in this regard may functionally include one or more controllers 310 configured to carry out that processing.

Those skilled in the art will of course appreciate that FIG. 6 is simply an example, and that the depicted circuits 300 may be realized, implemented, or otherwise configured within the node, based upon the execution of computer program instructions stored in memory 320 or within another computer readable medium in the entity.

Those skilled in the art will also appreciate that a "node" as used herein may refer to a wireless device, a radio node, a network node, a radio network node, or any other node in a wireless communication system.

Those skilled in the art will further appreciate that "UE" is a non-limiting term comprising any wireless device or radio node equipped with a radio interface allowing at least for receiving and measuring signals in DL. Some examples of UE in its general sense are PDA, laptop, mobile, sensor, fixed relay, mobile relay, a radio network node equipped with the UE-like interface (e.g., an LMU, a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single- or multi-RAT or multi-standard mode (e.g., an example dual-mode UE may operate with any one or combination of WiFi and LTE). A UE may be a wireless device capable of device-to-device or machine-to-machine communication.

A radio node is characterized by its ability to transmit and/or receive radio signals and it comprises at least a transmitting or receiving antenna. A radio node may be a wireless device or a radio network node. Some examples of radio nodes are a radio base station (e.g., eNodeB in LTE or NodeB in UTRAN), a relay, a mobile relay, remote radio unit (RRU), remote radio head (RRH), a sensor, a beacon device, a measurement unit (e.g., LMUs), user terminal, PDA, mobile, iPhone, laptop, etc. A radio network node is a radio node comprised in a radio communications network and typically characterized by own or associated network address. For example, a mobile equipment in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A).

A cell is associated with a radio network node, e.g., eNodeB, which may be interchangeably used with radio node in some embodiments, comprises in a general sense any node transmitting radio signals in DL and/or receiving radio signals in UL.

Some examples of radio network nodes are eNodeB, Node B, macro/micro/pico radio base station, home eNodeB, relay, repeater, sensor, transmitting-only radio nodes, beacon devices. A radio network node herein may comprise a radio node operating and/or at least performing measurements in one or more frequencies, carrier frequencies or frequency bands. It may be a radio node capable of CA. It may also be a single- or multi-RAT or multi-standard node, e.g., using the same or different base band modules for different RATs. Multiple cells may be associated with a radio network node.

Multiple serving cells for a UE are possible with carrier aggregation, so "a serving cell" herein is in general used throughout the description for CA and non-CA systems. With CA, primary cell (PCell) is one example of a serving cell, and another example is a secondary cell (SCell). For a UE in RRC_CONNECTED not configured with CA there is only one serving cell comprising of the primary cell (PCell). For a UE in RRC_CONNECTED configured with CA the term 'serving cells' is used to denote the set of one or more cells comprising of the primary cell and all secondary cells.

The term "network node" is a general term which may comprise, e.g., a radio network node or a core network node. Some examples of network nodes are MME, MDT node, eNodeB, SON node, positioning node, RNC, etc.

The term "centralized network management node" or "coordinating node" used herein is a network node, which may also be a radio network node, which coordinates radio resources with one or more radio network nodes and/or UEs. Some examples of the coordinating node are network monitoring and configuration node, MME, OSS node, O&M, MDT node, SON node, positioning node, a gateway node such as Packet Data Network Gateway (P-GW) or Serving Gateway (S-GW) network node or femto gateway node, a macro node coordinating smaller radio nodes associated with it, etc.

Although embodiments above generally describe verifying one or more signals as associated with one or more specific characteristics, other embodiments below may more specifically describe such verification in a certain context. For example, verifying one or more signals as associated with a specific radio node may also be described as verifying that specific radio node. Similarly, verifying one or more signals as associated with a specific cell may be described as verifying that specific cell. Extended to these and other contexts, therefore, "verification of a signal" herein may be used interchangeably with "verification of a radio node", "verification of a cell", "verification of a virtual cell", "verification of a cell sector or a cell part", or "verification of an area" (e.g., an area associated with at least one of the measured signal and the radio node transmitting the radio signal, such that the "area" is not limited to a cell area but instead may be smaller than a cell or may be in coverage of more than one cell).

Moreover, embodiments herein that perform verification after detection are described as "timing based verification". This term may be used interchangeably with "timing measurement based verification". Embodiments that perform verification before detection may be described as "pre-verification". Alternatively, pre-verification might be described as "timing verification" because in one sense the subsequent detection verifies the timing measurement.

Regardless, embodiments herein include using a timing measurement for verifying at least one radio node, cell, or area. These embodiments also include: (1) using timing measurements (and timing based verification, in particular) as part of a radio node identification or cell identification; (2) configurable measurement or measurement selection for verification or identification of a radio node or cell; and (3) verification or identification of a radio node or cell based on a plurality of measurements of different types (e.g., using a timing measurement and a power-based measurement).

Embodiments herein also include signaling means and methods to enhance usage of timing measurement based verification/identification. For example, this includes: (1) signaling of capability information associated with timing measurement based verification/identification; (2) triggering a device to do a timing measurement for verification of cell or another node/device; (3) reporting a result of a timing based verification or identification to a remote node; and (4) Providing a verification condition in assistance data to assist timing based verification or identification or verification or identification in general.

This signaling is either via direct links or logical links (e.g. via higher layer protocols and/or via one or more network nodes). For example, signaling from a coordinating node may pass another network node, e.g., a radio node.

Embodiments also include methods for using timing measurement based verification or radio node identification for D2D communication, energy saving, or by low-complexity devices. Embodiments further include testing means for timing measurement based verification and identification of a radio node or cell.

Of course, embodiments described herein apply for non-CA or CA networks. The embodiments are also not limited to LTE, but may apply with any Radio Access Network (RAN), single- or multi-RAT. Some other RAT examples are LTE-Advanced, UMTS, GSM, cdma2000, WiMAX, and WiFi. Accordingly, as one example a subframe may be an LTE subframe or may be used in a general sense to indicate any time interval or time slot. Such time interval length may also be pre-defined.

Embodiments described herein may be considered as independent embodiments or may be considered in any combination with each other to describe non-limiting examples.

Embodiments will now be described that relate to verification by a timing measurement. One or more embodiments include a radio node transmitting a radio signal and this signal (or the transmitting node or an area or a cell) is verified by a timing measurement. This verification may comprise one or more of: (1) performing at least one timing measurement for a given signal/channel whose characteristics are associated with characteristics of the radio node/area/cell being verified (e.g., the signal sequence depends on PCI of a cell associated with the radio node or on the identity of the neighbor wireless device being verified or some logical identity used for sequence generation transmitted by the radio node to be verified); (2) performing two or more timing measurements of different types for a given signal/channel; (3) performing two or more timing measurements of the same type for a group of candidate signals/channels which may be associated with the characteristics of radio node being verified (e.g., the group of candidate signals may be determined by a group of candidate identities); and (4) performing two or more measurements of any type, not necessarily limited to a timing measurement.

The characteristics associated with the radio node/area/cell which is being verified may be, e.g., PCI, device identification, any logical identity, code, a group code, a scrambling code, or parameter used for generating the signal/channel to be measured for verification. The timing measurement is performed on the signal/channel transmitted by the node being verified and may involve, e.g., correlation, preferably (though not limited to) in the time domain, of the measured signal to a reference signal generated based on the characteristic, demodulation, etc. For example, if the characteristic is a PCI, and the timing measurement is performed on a signal while assuming a different PCI, the measurement will fail since the signal will look like noise. This means that the PCI assumption was wrong.

The radio node being verified by a timing measurement may be considered as verified if performing of the timing measurement on a given signal associated with this radio node has been successful. Successful may here mean that the timing is determined with certain accuracy/reliability, and/or determined within a specific time window, or in a specific time instant in relation to another object, cell or signal etc. If it is possible to successfully perform a timing measurement on this signal, then the signal exists and the assumption is that it is associated with a node/cell/area which then also exists close enough to the measuring node.

In a specific embodiment, at least one verification criteria is pre-determined (e.g., by a requirement, standard, or configured) or received from another node (e.g., in the assistance data; for example, a threshold such as a maximum timing or distance may be provided by another node where the criteria may be used to verify the obtained detection result and the criteria may reflect e.g. the maximum estimated distance to the radio node or coverage range of the verified signal/node/area/cell).

Figure 7:
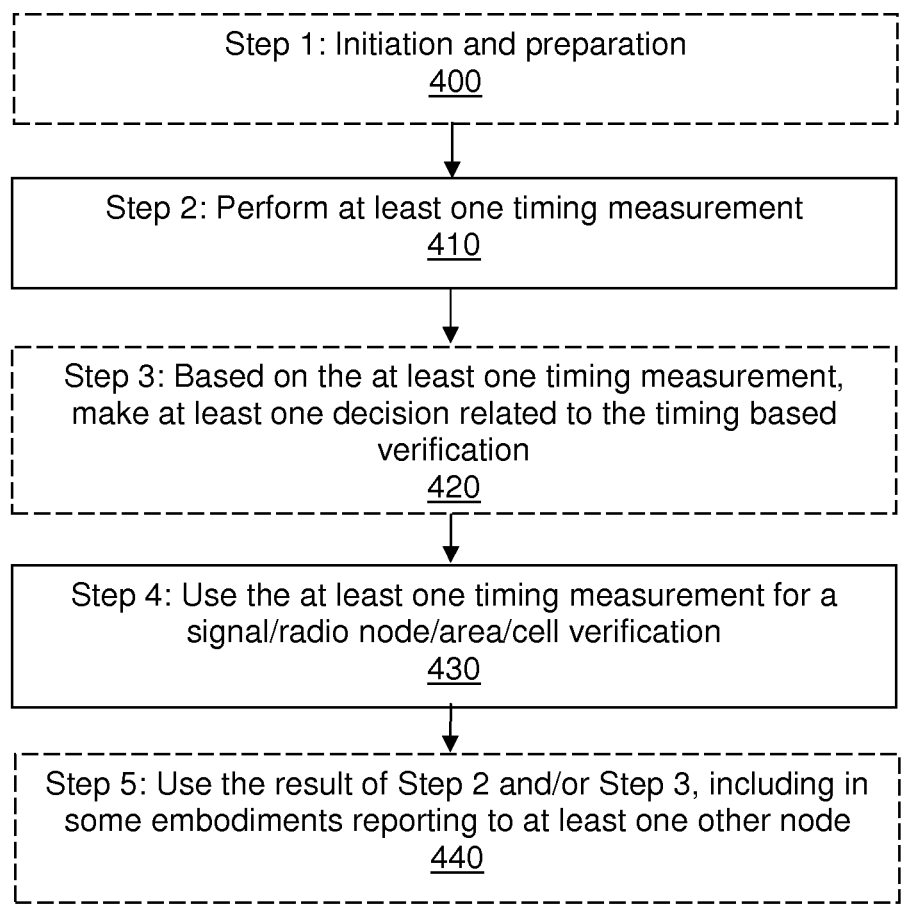
FIG. 7 is a logic flow diagram of a procedure for verification as well as signaling according to one or more embodiments.

In another embodiment, timing verification may be understood as verification of a timing measurement by e.g. performing detection step and/or identification step, i.e., the steps described momentarily in FIG. 7 may be performed in a different order. For example, a timing measurement may be performed first and then detection step may be performed after, whilst the opposite order is also possible. That is why "timing verification" and "timing based verification" may be used interchangeably herein.

FIG. 7 illustrates an example procedure according to various embodiments, e.g., for verification and for signaling means. As shown in FIG. 7, a method herein (optionally) includes initiation and preparation as Step 1 (Block 400). The method further includes performing at least one timing measurement as Step 2 (Block 410). The method also (optionally) includes, based on the at least one timing measurement, making at least one decision related to the timing based verification as Step 3 (Block 420). The method then includes as Step 4 using the at least one timing measurement for a signal/radio node/area/cell verification (Block 430). Finally, the method (optionally) includes using the result of Steps 2 and/or 3, including reporting to at least one other node.

Any of these Steps may be performed by the verifying node with or without assistance or interaction with other nodes. In another example, at least some steps, including the verification step and the decision-making step, may be performed by a node other than the node performing measurements (e.g., the sampling results are transferred by the measuring node to another node). Also, Steps 1, 3 and 5 may also be implemented in a node different from the verifying node, e.g., a radio node or a network node.

Step 1's initiation and preparation (Block 400) will now be described in more detail. The timing measurement based verification may be performed, for example, by one or any combination of the below strategies: (1) autonomously; (2) upon an indication, a set of assistance data, or an explicit request received from another radio node or network; (3) periodically (the periodicity may be pre-configured in the node, dynamically determined by the node e.g. depending on the node's activity state or interference conditions or when there is a risk of confusion, or may be configured by another node); (4) upon a configured or pre-determined triggering event (e.g., the serving cell signal quality drops below a threshold, a cell detection or cell identification is complete, upon radio link failure or connection drop, etc.); (5) upon a configured or pre-determined condition (e.g., when the signal strength of a determined or identified cell is below a threshold, when the position uncertainty of the measuring UE is large); and (6) triggered by a result of or a condition based on sensing of radio spectrum.

The initiation step may also take into account at least one factor for selecting timing based verification, described later, in order to base the decision on the need to initiate timing measurement based verification.

The purely autonomously-decided and autonomously-performed timing measurement based verification may not require additional signaling but may still benefit from enhanced signaling support related to any of Steps 1-5.

Accordingly, the preparation may comprise, e.g., any one or more of: (1) determining a set of measurements comprising at least one timing measurement, (2) configuring at least one of the measurements from said set of measurements, (3) generating a reference signal sequence, and (4) obtaining or acquiring at least one characteristic and/or at least one parameter.

With regard to configuring at least one of the measurements from said set of measurements (in (2) above):

- the measurement configuration may be pre-defined, obtained by a rule or in accordance to a requirement, and/or received from a remote node,
- the measurement configuration may also comprise measurement type (in one example, the measurement type may comprise the type of the at least one timing measurement to be used for verification),
- the measurement configuring may be autonomous by the measuring node or involving interaction with another node such as receiving a request which may also comprise some measurement configuration parameters (e.g., another radio node such as macro eNodeB or another network node such as positioning node),
- the configuring at least one of the measurements may comprise applying measurement configuration parameters, where the parameters may be obtained as described below.

With regard to obtaining or acquiring at least one characteristic and/or at least one parameters (in (4) above), that at least one characteristic and/or at least one parameter may be associated with:

- the radio node, area, or cell to be verified, where the characteristic may be e.g., PCI, a node identity, a global cell identity, radio node's location, tracking area or location area identity, a code, a group code, a scrambling code associated with the measured signal, radio node, area or cell sector, or cell, etc,
- the signal/channel to be measured, where the characteristic may be a frequency, EARFCN, component carrier information, transmission bandwidth, measurement bandwidth, signal/channel type, signal/channel transmission pattern in time-frequency space, transmit power of the signal/channel, code, group code, scrambling code, transmit port number of the signal/channel, cyclic prefix; a number associated with the signal/channel sequence, sequence group and/or associated with the time-frequency resource where the signal/channel is transmitted, random sequence number or seed, etc.

timing measurement (e.g., a pattern indicating when the timing measurement may be performed),
how verification should to be performed, Any of the above characteristics/parameters may be obtained by the radio node autonomously or with interaction with at least one other node, e.g., by any one or more of:

it may be pre-determined or pre-configured in the radio node,
generated by using a rule or obtained from a table,
received from another node (e.g., in assistance data from a radio network node or a network node or a radio node, in a neighbor list, via network or by means of D2D communication),
by performing cell detection (e.g., blind cell detection or network-assisted cell detection),
by performing node detection or device detection in D2D communication,
by performing radio node identification or cell identification (e.g., prior-art PSS/SSS based cell detection followed by RSRP measurement based verification, after which timing measurement may still be used for verification),
from a set of one or more pre-configured and/or stored in the memory characteristics (e.g., a pre-configured identity or a list of identities, or from the standard or a requirement),
from a set of one or more derived characteristics (e.g., derived from the serving cell identity),
by using a generating module (e.g., generating a reference sequence).

Any of the factors described below may be used e.g. to base the decision on initiating a timing measurement based verification (in Step 1) or to make a decision related to the timing based verification (in Step 3). These factors include: (1) radio node's activity state; (2) the purpose of verification; (3) the quality of detected cell; (4) the verifying node's capability; (5) the type of node to be verified; (6) the signal availability and/or interference conditions; (7) required accuracy and/or measurement period; (8) energy consumption; (9) complexity; and (10) assistance data availability.

With regard to (1) the radio node's activity state, that state may be for instance IDLE mode or CONNECTED. For example, when the UE is connected and synchronized to a serving cell the serving cell link may be used as a reference link (e.g., with the corresponding reference timing) for the timing measurement used for verification, otherwise (e.g., in IDLE state) either RSRP or a one-way one-link timing measurement may be used for verification; in another example, due to the energy saving reason it may be so that in a low-activity and/pr power-saving state (e.g., DRX or IDLE mode) the timing based verification is preferable.

With regard to (2) the purpose of verification, as an example using a timing measurement may be more justified when the verification is for the purpose of positioning or related to an emergency session; another example is that a timing measurement may be used when proximity detection is the purpose.

With regard to (3) Quality of detected cell—using a timing measurement for a weak cell may be more justified.

With regard to (4) verifying node's capability, as an example the configuring node, based on the known capability of the verifying node, may configure or assume that e.g. prior art verification when the node is not capable of using a timing measurement for verification.

With regard to (5) type of node to be verified—e.g., a timing measurement may be used for verifying another wireless device in D2D communication or for verifying a small-cell radio network node (e.g., a femto cell or a pico cell or a cell of a medium-range BS).

With regard to (6) signal availability and/or interference conditions—e.g., a timing measurement may be preferable when a certain reference signal is available (e.g., PRS are typically transmitted in low-interference subframes and/or pre-defined/standardized timing measurement requirements may be defined for lower signal quality, e.g., Es/Iot, than the power-based measurement requirements such as RSRP).

With regard to (7) required accuracy and/or measurement period—e.g., the more accurate and/or faster measurement type is chosen or the measurement which can be reliably performed at lower signal levels, e.g., have lower Es/Iot condition.

With regard to (8) energy consumption—e.g., the less energy-consuming measurement is chosen. In some applications, timing determination could involve less hardware resources that actual signal strength measurements. Taking an (OFDM) LTE based system as an example, timing could be based on time-domain correlation while RSRP (signal strength) is made in the frequency domain, which in turn requires involvement of FFT processing hardware which consumes more power and requires more processing and memory resources.

With regard to (9) complexity—e.g., for the same technical reason as described for energy consumption above, timing measurement based verification may be less complex and less resource demanding and thus particularly suitable for low-cost devices or low-cost radio nodes in general. Thus, timing based measurement verification may be preferable and selected depending on the measuring node's capability related to the hardware complexity.

And with regard to (10) assistance data availability—e.g., timing measurement may be preferable for cells not indicated in the assistance data e.g. when the exact mapping to the time-frequency domain of the measured signal is not known or uncertain to the measuring node the measuring node may perform time-domain correlation (this may be beneficial in asynchronous network or for verifying radio node in other-RAT networks).

Note that the radio node may autonomously decide to use a timing measurement for verification. For example, the node may be pre-programmed to do so, and/or be triggered by internal triggers/conditions, and/or may decide based on the available measurements/information.

An example of an autonomously decided timing measurement verification UE includes a UE autonomously performing verification of an identified cell and performing an action responsive to the verification result. For example, the UE may choose whether to keep/trust or not keep/not trust the cell identity being verified. As another example, the UE may store the kept cell identity. As yet another example, the kept cell may be reported as UE normally does for cell identification (although the timing measurement used for verification cannot be reported for this purpose with the prior art signaling);

An example of an autonomously decided timing measurement verification UE includes a UE autonomously performing cell identification and verification prior to reporting a timing measurement (the one used for verification or another timing measurement) for a neighbor cell for positioning purpose.

Next, example embodiments for Step 1 will be described, namely measurement choice and/or performing timing measurement based on an indication, assistance data or an explicit request from another radio node or network node.

According to an embodiment, the verifying node may receive an indication or a request from another radio node or network node, indicating the need or an explicit request for verification of a radio node or a cell where the verification may also imply using a timing measurement. The indication or request may further indicate using a timing measurement, and may also specify at least the type of a timing measurement or a list of applicable measurements where the list may comprise at least one timing measurement (alternatively, such a list may be pre-determined, e.g., the list may comprise 'RSRP' (signal strength) and 'time of arrival' or 'time difference of arrival'). The indication or the request may also comprise a characteristic of a signal/channel or a characteristic of the radio node or the cell to be verified (e.g., an identity associated with the node or a set of candidate identities).

Assistance data may also be provided to enhance identification or verification. In the prior art, for eICIC, UE may be provided with a time-domain measurement resource restriction pattern for RRM, including cell identification. This data does not indicate which measurement should be used for verification, but it contains a list of cells and a pattern indicating subframes when measurements are to be performed. In an embodiment, there is an assistance data or neighbor list provided comprising at least a set, set 1, of identities associated with radio nodes (the other set, set 2, may comprise other identities not comprised in set 1), and the verifying node uses a timing measurement for verifying only radio nodes from one of the two sets, i.e., either Set 1 or Set 2.

As can be noticed from the above, when there is a choice possibility, the verifying node or the configuring node (e.g., the node sending the indication, assistance data or request) may also choose to use a timing measurement for verification, e.g., instead of the prior-art signal strength (e.g., RSRP) measurement. This decision may also be autonomous, i.e., not explicitly indicated in the indicator, assistance data or request. This choice decision may be based e.g. on the factors described above.

In yet another embodiment, the assistance data may comprise information about aggressor signal/node/cell information, e.g., in a heterogeneous network. This data may also be useful to configure the detecting or measuring node to adjust or optimize its receiver to deal with high interference (e.g., use a specific receiver technique such as interference suppression, cancellation, puncturing rate matching, etc.). The aggressor information may comprise e.g., any one or more of: an identifier associated with the signal/node/area/cell, time offset with respect to a signal of the serving cell, a set of time and/or frequency resources (e.g., a measurement pattern which may indicate specific subframes and/or subcarriers where the signals can be measured by the measuring node or are transmitted by the transmitting node and/or the signals should not be measured), etc.

In yet another embodiment, the assistance data may comprise at least one verification criterion, e.g., a threshold for a timing measurement or detection threshold. The timing measurement threshold may reflect e.g. a maximum and/or a minimum distance or coverage range for the signal/node/cell/area being verified (e.g., the timing result should be below a threshold i.e. within a certain distance; in another example, the timing threshold should be above a threshold when the minimum distance is known or has been estimated).

Step 2's performing of the at least one timing measurement (Block 410) will now be described in more detail, in conjunction with describing Step 3's making of the at least one decision (Block 410) in more detail.

The timing measurement is performed on a signal/channel transmitted by the radio node being verified and may involve, e.g., demodulation and/or correlation of the measured signal to a reference signal generated based on the characteristic, etc. The timing measurement type may be pre-defined or configured, e.g., as explained above.

In one embodiment, the timing measurement quality or uncertainty may also be obtained for the at least one timing measurement.

Step 2 may involve performing also measurements other than the at least one timing measurement. The other measurements may comprise at least one other timing measurement or power-based measurement (e.g., received signal strength or received signal quality such as RSRP and RSRQ in LTE) or AoA. In some embodiments, the other measurement may also be used for the radio node verification, in addition to the at least one timing measurement, e.g., to increase the verification result reliability when the signals are week or measurement quality is poor. In one embodiment, the other measurement may be performed prior the at least one timing measurement. In yet another embodiment, the at least one timing measurement may be performed prior the other measurement.

In Step 3, based on at the least one timing measurement, at least one decision may be made in relation to the timing based verification (e.g., in relation to Step 4 and/or Step 5). The decision may comprise a decision on whether timing based verification is to be used or not (if yes, go to Step 4, otherwise stop or may go to any of: Step 1, 2, and 5). The decision may be based, e.g., on the timing estimate, expected or estimated timing measurement quality, or probability of a correct verification result. The decision may be made by the verifying node or by a node other than the verifying node or via interaction with the other node.

Step 4's using the at least one timing measurement for a radio node's verification (Block 430) will now be described in more detail. The radio node being verified by a timing measurement may be considered as verified if performing of the timing measurement on a given signal associated with this radio node has been successful. In different embodiments, successful may imply e.g. any one or more of:
 the measured signal has been reliably detected,
 the measured channel has been demodulated correctly,
 there is at least one correlation peak above a threshold (where the threshold may be configured statically or dynamically),
 the measurement was delivered to higher layers from the physical layer,
 the measurement quality or uncertainty meets a certain criteria (e.g., the measurement sample standard deviation or measurement uncertainty or measurement error is below a pre-defined threshold),
 the timing was determined within a certain time window,
 the timing was determined at certain time instant relative to timing of another signal, or relative an absolute timing instant,
 The measurement meets at least one condition/criterion which may be pre-defined or provided in the assistance data.

In one embodiment, the verification step comprises also estimation of the result reliability, accuracy or uncertainty, which in one example may be obtained based on standard deviation or variance estimate, or another statistical uncertainty measure among multiple samples or by a pre-defined mapping environment/channel conditions for the measurement (e.g., delay spread) to the measurement quality.

In another embodiment, the timing measurement verification may be performed jointly together with Step 2.

In some embodiments, verification may also involve at least one other measurement, in addition to the at least one timing measurement, e.g., to improve the quality of the verification result.

In yet another embodiment, there may also be a decision in Step 3 to not perform the timing measurement based verification. Instead, another measurement may be used for verification or no verification is performed (e.g., when the unreliable verification is expected), while the same apparatus may, however, decide in Step 3 to use the at least one timing measurement for verification in some cases.

Step 5's using the result (Block 440) will now be described in more detail. The result of the timing measurement based verification or of the result of timing measurement based radio node or cell identification may be used by the verifying node autonomously or reported to another radio node or network node. Thus the result may also be used by the node which receives the result. The result may comprise e.g. any one or more of:
- an indication of successful verification,
- an indication of successful radio node identification or cell identification (e.g., of a PCI known to the network and the verifying node),
- the identity or characteristic (e.g., code, a scrambling code, a code group, etc.) associated with the at least one verified or identified signal, radio node, area, or cell,
- at least one timing measurement which was used for verification or identification,
- uncertainty, statistical uncertainty, confidence level (e.g., "high"/"low" or X % confidence), measurement error, or an estimated quality measure associated with the verification or identification step, e.g. an uncertainty measure of the at least one timing measurement, in one embodiment, when the result quality is below a certain level (e.g., confidence level s below a threshold, uncertainty is above a threshold, an estimated error is above a threshold) the reporting node may choose to not report the result and/or report a failure or error indication/message,
- at least one other measurements (the other measurements may comprise a second timing measurement of the same or different type than the at least one timing measurement; a power-based measurement, e.g., when both RSRP and the timing measurement are used for verification) which were also used for verification, in addition to the at least one timing measurement,
- an explicit or implicit indication of that a timing measurement was used for verification, where an example of an explicit indication is a binary indicator, and an example of an implicit indication is using different Information Elements when signaling a result of verification/identification using and not using timing measurement.

Some non-limiting examples of nodes receiving the result are a radio base station, a relay, a radio network node in general, a core network node in general, positioning node, MDT node, another wireless device, etc.

Some non-limiting examples of nodes sending the result are any wireless device, eNodeB, a femto BS, a radio network node in general, a wireless device capable of D2D communication, a low-complexity wireless device, a low-cost MTC device, etc.

The timing measurement based verification or the new radio node identification approach may be performed for any purpose, where some examples are:
- ID selection for the searching radio node (e.g., when switching ON or joining a network),
- Mobility (e.g., neighbor discovery by a radio network node; determining cells for the handover purpose, cell switching or carrier switching with CA, cell selection/reselection or handover intra-, inter-frequency or inter-RAT),
- RRM (e.g., determine neighbor cells, determining aggressor cells),
- SI reading (e.g., CGI reading, femto BS discovery or identification),
- MDT (e.g., the timing measurement may be requested as a part of MDT measurement configuration),
- Positioning (e.g., for E-CID positioning or proximity-based positioning; for determining proximity of an aggressor radio node or of a victim radio node;
- for distance estimation which may be more accurate with timing measurement than with RSRP),
- Network listening (e.g., by femto BS) or neighbor device discovery (e.g., D2D communication),
- Energy saving in the UE by preferring performing low-complexity time-domain correlation search approach which may be complemented by timing based verification or identification,
- Low-complexity verification demand in the UE,
- Selecting or configuring CoMP or CA links,
- Proximity detection (e.g. D2D communication (i.e. whether a network node should initiate a D2D connection or not)),
- Interference coordination (e.g., detecting aggressor and/or victim radio nodes, determining the proximity of an aggressor radio node or of a victim radio node),
- SON, network planning, optimization, or (re)configuration.

Capabilities associated with timing measurement based verification will now be described. In this part, a verifying node is characterized by its ability of performing verification using at least one timing measurement or a pre-defined extended (compared to prior-art) set of measurements, where the set comprises at least one timing measurement. This capability may be comprised in a more general capability, e.g., any UE capable of CoMP may be capable also of using a timing measurement for verification. The capability may also be related to the node's ability to communicate with another node (e.g., a UE [e.g., by D2D communication] or radio node or a network node) to obtain the assistance from the another node, e.g., receiving assistance data (comprising of e.g. PCI list) for performing timing measurement based verification.

A capability may also comprise the node's ability of using at least a timing measurement as a part of cell identification.

Another example of capability associated with timing measurement based verification is the ability of using a configurable measurement for verification.

Any of the capabilities above may be signaled to another radio node or radio network node. The capability information may be used e.g. when configuring measurements, building up cell identification and/or measurement assistance data, requesting SI reading, etc.

The capabilities above may also be taken into account when testing UE requirements, e.g., intra-frequency measurement requirements, cell identification requirements, reporting requirements, SI reading requirements, etc., particularly when the requirements for the timing measurement based verification are different from those when another measurement type (e.g., prior-art RSRP) is used instead.

Figure 8:
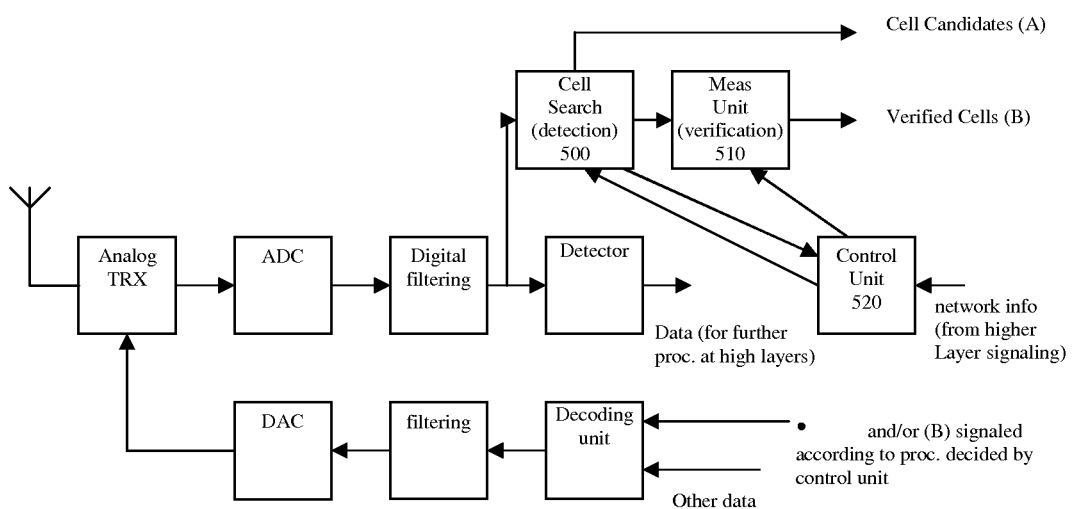
FIG. 8 is a block diagram of a radio node apparatus configured to implement one or more embodiments.

Referring now to FIG. 8, this figure describes an example radio node apparatus, e.g., user equipment, implementing one or more embodiments described above. In FIG. 8, the Measurement Unit (verification) 510 may implement e.g. Step 2 and/or Step 4. Cell Search (detection) 500 together with the Measurement Unit (verification) 510, with an optional interaction with the Control Unit 520, may implement embodiments related to radio node or cell identification described above. Reporting of cell candidates (A) and/or verified cells (B) may be examples of the result described above.

Next, some examples are provided for steps in an example wireless device, which may implement the apparatus shown in FIG. 8, where the wireless device is using a timing measurement for radio node/cell verification and/or identification. These example steps are shown in FIG. 9.

Figure 9:
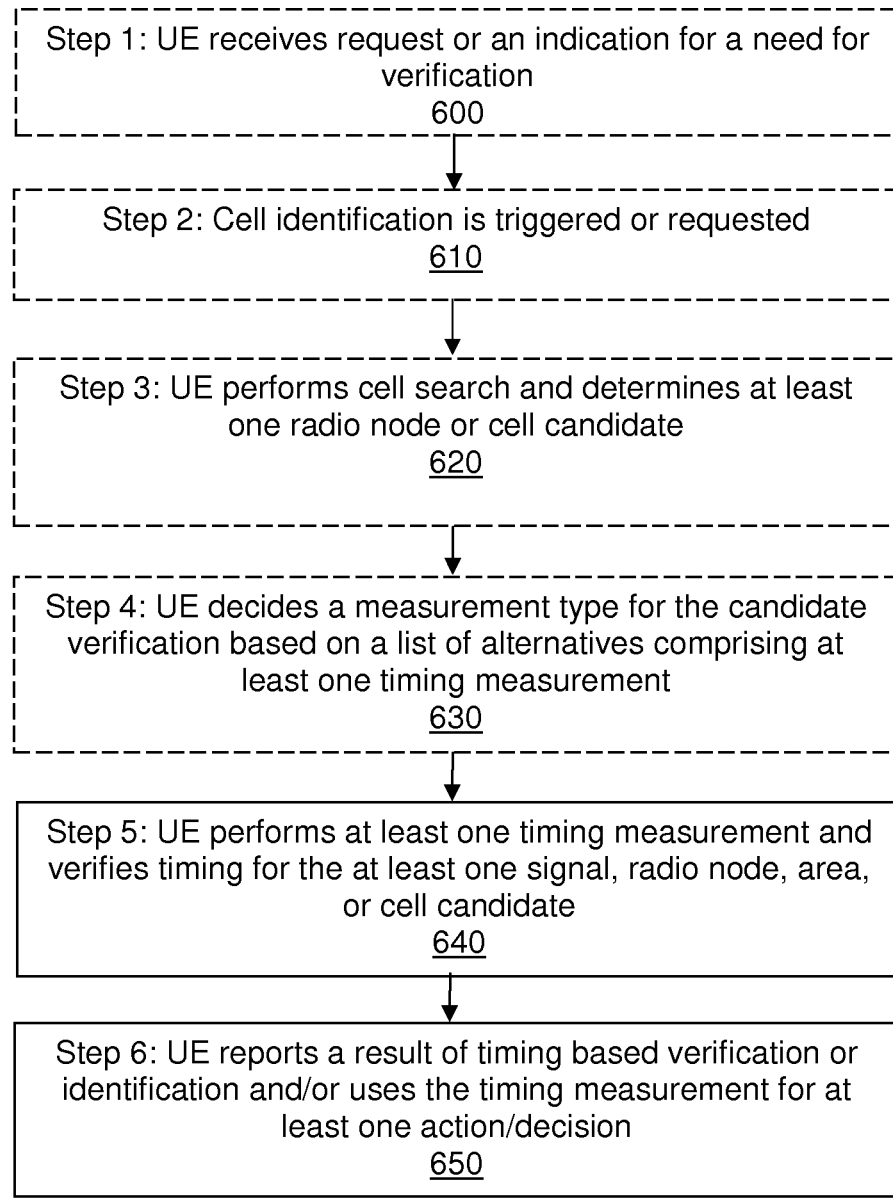
FIG. 9 is a logic flow diagram of one or more methods implemented by the apparatus of FIG. 8 according to one or more embodiments.

As shown in FIG. 9, Step 1 (optional) includes the UE receiving a request or an indication for a need for timing verification (Block 600). Step 2 (optional) includes cell identification being triggered or requested (Block 610). Step 3 (optional) includes the UE performing cell search and determining at least one radio node or cell candidate (Block 620). Step 4 (optional) includes the UE deciding a measurement type for the candidate verification based on a list of alternatives comprising at least one timing measurement (Block 630).

Step 5 then includes the UE performing at least one timing measurement and verifying timing for the at least one signal, radio node, area, or cell candidate (Block 640). In one example, a verification criteria and/or condition may be autonomously decided by the UE, may be pre-defined or configured, or may be obtained from another node.

Finally, Step 6 includes the UE reporting a result of timing based verification or identification of at least one signal/radio node/area/cell and/or using the timing measurement for at least one action/decision (Block 650).

Figure 10:
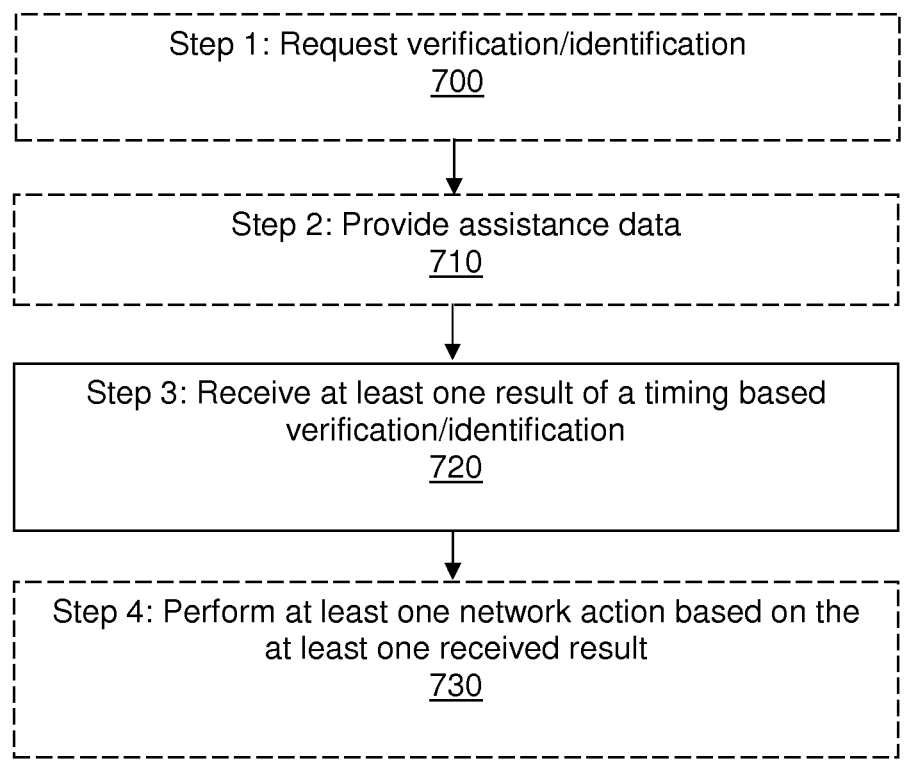
FIG. 10 is a logic flow diagram of steps in an example network node according to one or more embodiments.

Referring now to FIG. 10, this figure illustrates steps in an example network node implemented according to some embodiments. As shown in FIG. 10, these steps include Step 1 (optional) requesting verification/identification of at least one radio node or cell, for which verification/identification the timing measurement based verification/identification approach is possible (Block 700). Further, Step 2 (optional) includes providing assistance data indicating or associated with a certain type of a timing measurement to be used for verification/identification (Block 710).

Step 3 then includes receiving at least one result of a timing based verification/identification for at least one verified/identified signal, radio node, area or cell (Block 720). This result may be for instance a timing measurement which was used for verification/identification of the signal, radio node, area, or cell.

Finally, Step 4 (optional) includes performing at least one network action based on the at least one received result (Block 730). This may include for instance (1) adjusting timing of the verified/identified radio node or cell which may be used for TDD purposes, inter-cell interference coordination such as eICIC, (2) generating/triggering a TA command, (3) generating/triggering HO command, (4) configuring CA, (5) configuring CoMP, (6) configuring eICIC ABS or measurement pattern, (7) triggering a request of another measurement, (8) error logging, (9) updating AECID positioning database, (10) finding location of the verifying node or of the verified node, (11) adjusting scheduling to avoid aggressor interference, etc.

Figure 11:
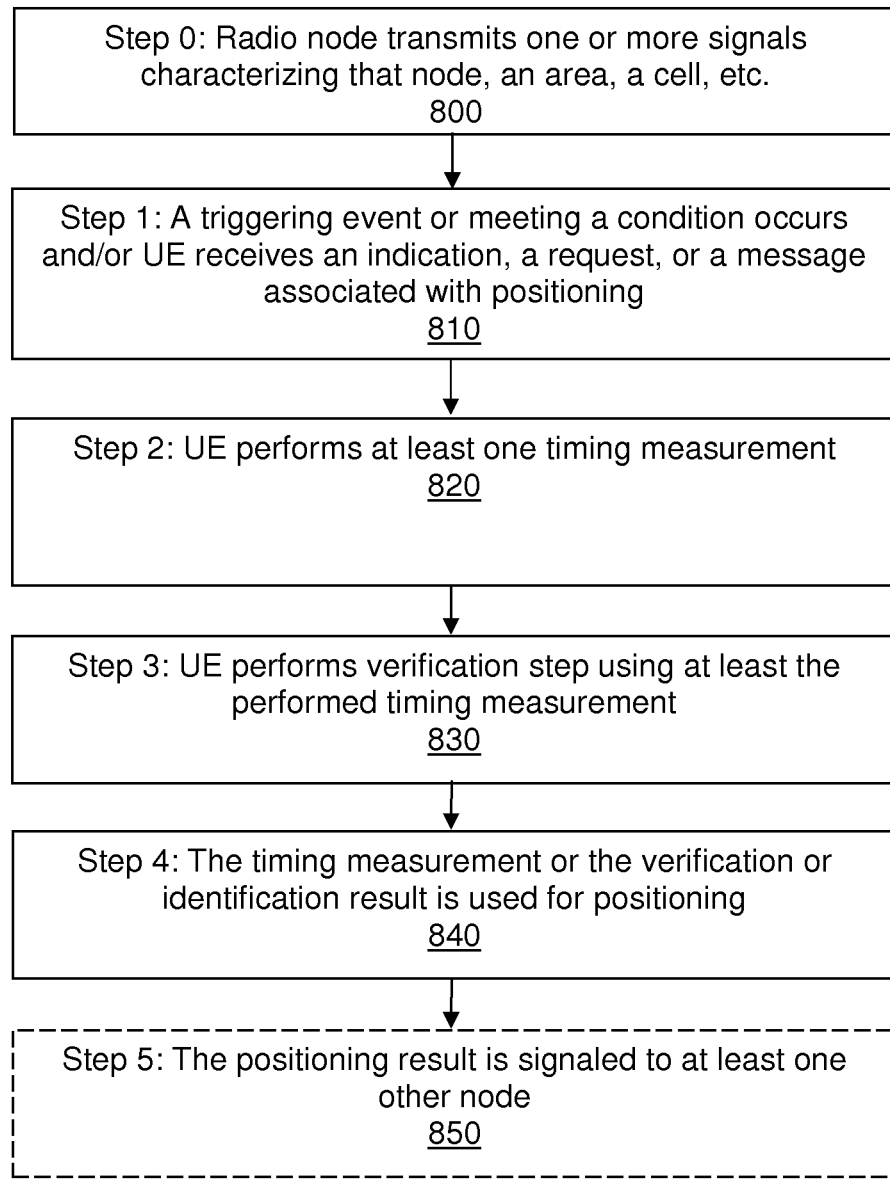
FIG. 11 is a logic flow diagram of example steps for enhancing positioning according to one or more embodiments.

Referring now to FIG. 11, this figure illustrates example steps that may be implemented and used to enhance positioning. These embodiments may be combined with other embodiments above.

As shown in FIG. 11, the steps (at least step 0 and other steps) are implemented in more than one node. But also steps 1-5 may involve more nodes than just the UE.

Regardless, FIG. 11 shows that Step 0 includes a radio node transmitting one or more signals characterizing that node, an area, a cell, etc. (Block 800). This area, cell, etc. may or may not be associated only with the transmitting node. In one example, it may be associated with a serving radio node of the transmitting node.

Step 1 then includes a triggering event or meeting a condition occurs and/or UE receives an indication, a request, or a message associated with positioning (Block 810). For example, this may be a positioning/location request, positioning assistance data, positioning measurement request, any message triggering a measurement for positioning, a proximity indication of a radio node, etc.). In one example, any one or more of the following may also apply.

The indication/request/message may be received from a network node or UE. Some examples of the network node are eNodeB (e.g., serving eNodeB or a neighbor eNodeB); eNodeB, RRU, RRH, repeaters or any node which is sharing cell ID with another node; eNodeB which 'owns' or also uses the cell ID shared with the node which will be verified/identified in next steps below; MME; MDT node; or positioning node (e.g., E-SMLC or SLP in LTE).

The indication/request/message may contain a code, a code group, a scrambling code where the code is associated with the area or cell. The indication/request/message may contain frequency, component carrier information or EARFCN. The indication/request/message may comprise channel bandwidth and/or measurement bandwidth and/or transmit bandwidth of a signal which may be measured. The indication/request/message may explicitly indicate the timing measurement to be performed. The indication/request/message may be transferred via higher-layer protocol. Some protocol examples are RRC or LPP or LPPe or SUPL. And the indication may be via lower layer signaling, e.g., a bit transmitted on a physical control channel.

Finally, the indication/request/message may comprise at least one or a list of radio node identities, global cell identities, PCIs, cell sector or cell part identities, shared cell identities, a 'fake' PCI or a logical identity or a number associated with the node which will be verified/identified in the next steps below when the node does not create own cell, area identities, tracking area identities, etc.

Next, Step 2 includes the UE performing at least one timing measurement (Block 820).

Step 3 then includes the UE performing the verification step using at least the performed timing measurement (Block 830). In one example, any one or more of the following may also apply. The UE may autonomously decide to use the timing measurement for verification or decide this based on the received indication/request/message. In one embodiment, performing verification may also comprise performing the node/area/cell identification. The timing measurement may be RSTD, UE Rx-Tx, TA, or any other timing measurement. In one embodiment, the radio node to be verified/identified may be RRU, repeater, radio node not using an own cell identity rather than using a cell identity used by another radio node in its area (e.g., two radio nodes are sharing the same cell ID). In another embodiment, the radio node is an antenna or a transmitting point of a remote or distributed antenna system.

In Step 4, the timing measured or the verification or identification result is used for positioning (Block 840). For example, in one embodiment, the measurement or the verification or identification result in general is used by the UE, e.g., to calculate the location of its own, of the area or cell (e.g., using a map and applying a mapping of the result to an area or a cell), or the location of the transmitting radio node. In another embodiment, the UE may signal any one or more of the measurement result or the verification or identification result to at least on other node (e.g., UE, radio network node or network node in general such as positioning node). In yet another embodiment, the node receiving the result from the UE uses the result for positioning of its own, positioning of the transmitting radio node, or positioning of the UE.

Finally, in optional Step 5, the positioning result is signaled to at least one other node. Here, the positioning result is obtained by the UE or the node receiving the result in the previous step and signaled to at least one other node. This other node may be for instance a positioning node, the UE or another wireless device, a radio network node, LCS Client, PSAP, or a network node in general. The at least one other node may use the received result for positioning or other purposes.

Using a result for positioning (by the UE, another wireless device or a network node) in steps 4-5 above may further comprise any one or more of (1) positioning method selection, (2) location calculation or finding a location area of the UE, of the transmitting radio node, or a neighbor radio node, (3) calculation location uncertainty and/or confidence of the location of the UE, of the transmitting node, or of a neighbor radio node, (4) populating positioning database, and (5) correction of the available location information of the UE, of the transmitting node, or of a neighbor radio node. In one example of (2) for positioning calculation any of the following positioning methods may be used: CID, E-CID, AECID, OTDOA, hybrid positioning, pattern matching, fingerprinting, a positioning method used for D2D communication, or a positioning method which uses area identities and/or timing measurements.

In one example, a positioning result may be a point or an area or an indicator associated with an area. In another example, the positioning result may be described by using one of the pre-defined GAD shapes.

The methods described herein, e.g., the methods in the UE (or any wireless device e.g. mobile relay), can also be configured in the test equipment (TE) node (aka system simulator (SS)). The TE or SS will have to implement all methods related to timing measurement based verification or identification. The purpose of the test is to verify that the UE is compliant to the pre-defined rules, protocols, signaling and requirements associated with at least one embodiment described in the current invention. The TE or SS will also be capable of receiving the UE measurement results and analyzing the received results. This may include for instance comparing the received measurements or a metric based on the received results with the reference results or the reference metric. The reference may be based on the pre-defined requirements or UE behavior.

When testing, at least one requirement associated with any of the embodiments described above has to be fulfilled. Some examples of the requirements are intra-frequency, inter-frequency or inter-RAT cell identification requirements, requirements for identification of a radio node, requirements for identification of a wireless device (e.g., in D2D communication), proximity detection requirements; timing measurement requirements or timing accuracy requirements for a timing measurement. New timing measurement and/or timing accuracy requirements may be specified for a case when verification and/or identification steps are executed. The requirements may be different compared to the existing timing requirements (e.g., the measurement time may be extended when verification and/or identification steps are executed or the measurement accuracy may be relaxed [e.g., met at a higher Es/IoT or have worse accuracy at the same Es/Iot, compared to the existing requirements] when verification and/or identification steps are executed).

The requirement is verified in a testing environment implementing at least one of the embodiments described above.

Advantages of one or more embodiments herein include using at least one timing measurement for verifying or identifying of e.g. a signal, a radio node, an area or a cell. Those advantages further include faster and more accurate verification or identification of a signal, a radio node, an area, or a cell. Also, the advantages include reduced cell identification complexity and resource consumption (including energy savings). The advantages include providing a verification and identification approach which may benefit D2D communication. Finally, the advantages further include enhanced positioning.

In view of the above, at least some embodiments herein can be described as generally employing one or more timing measurements in order to identify (i.e., search for) nearby wireless nodes (that is, nodes within wireless communication range). Such timing measurements may be employed instead of or in addition to conventional signal strength measurements, as a way to identify nearby nodes more quickly and more accurately, with less complexity and reduced power consumption.

Figure 12:
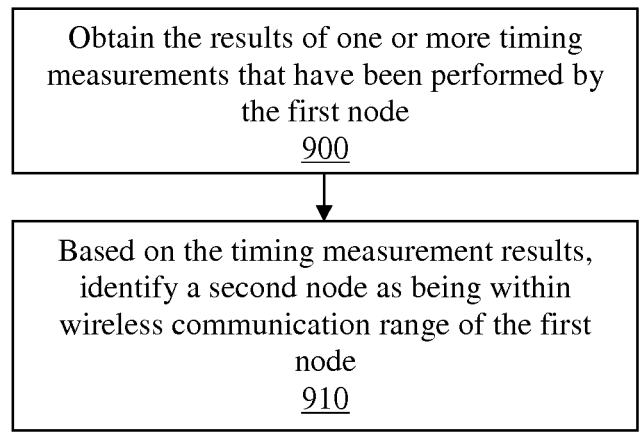
FIG. 12 is a logic flow diagram of a method implemented by a node in a wireless communication system according to one or more other embodiments.

Accordingly, one or more embodiments herein include a method implemented in a wireless communication system. The method, as shown in FIG. 12, entails obtaining the results of one or more timing measurements that have been performed by a first node in the system on one or more signals received by that first node (Block 900). The method then includes, based on the timing measurement results, identifying a second node having characteristics on which generation of one or more of said signals was based as being within wireless communication range of the first node (Block 910).

In some embodiments, the method in FIG. 12 is implemented by the first node itself. In this case, obtaining the timing measurement results may involve actually performing those timing measurements. And identifying the second node may involve the first node itself performing identification related processing steps. Or, such identification may involve sending the timing measurement results to a third node in the system, and extracting information from a response received from the third node indicating that the second node is identified as being within wireless communication range of the first node.

In other embodiments, though, the method is implemented by a node in the system other than the first node. In this alternative, obtaining the timing measurement results simply entails receiving those results from the first node, perhaps via one or more intermediate nodes.

Regardless of the node that implements the method of FIG. 12, the method includes using the timing measurement results to identify a second node as being within wireless communication range of the first node. Note that identifying the second node as being within range of the first node differs from actually calculating or otherwise determining the actual range between the first and second nodes. That is, simply determining the identity of a node within range is not the same as determining the range to that node.

In this regard, identification may entail any number of different processing steps. For example, identification may entail detection of the second node (including detection of the identity of that node) and verification that the second node has in fact been detected. In the case of multiple processing steps for identification, basing identification on the timing measurement results entails employing those results in one or more of these processing steps. Thus, in a general sense, any given node that employs the timing measurement results to perform at least one processing step effectively performs identification based on those results. In a more narrow sense, such a node at least assists with identification based on the timing measurement results.

Consider, for example, an embodiment where the timing measurement results are used in a processing step for verifying that the second node has been detected. In this case, identification may entail verifying, based on the timing measurement results, that one or more signals detected by the first node indicate an identity of the second node (where such signals may be the same as or different from the signals on which the timing measurements are performed). In other words, identification may involve determining an identity of the second node based on one or more signals detected by the first node and then verifying, based on the timing measurement results, that those detected signals actually indicate that identity.

For example, when performed by the first node itself, identification may initially comprise determining the identity of a node (here, called the second node) indicated by one or more first signals detected by the first node. Such may entail decoding those detected first signals or otherwise determining the identity from an explicit or implicit indication in the first signals. In at least some embodiments, however, these first signals have a low quality (e.g., high interference), meaning that the identity determined from the signals is not very reliable and that the first node cannot be confident that a node with the determined identity is in fact within wireless communication range.

Accordingly, the first node thereafter verifies the determined identity by performing one or more timing measurements. In particular, the first node uses the determined identity to derive or otherwise determine one or more characteristics of one or more second signals that are transmitted by nodes in conjunction with the first signals. In embodiments where the second signals are different from the first signals, these second signals may have a better quality than the first signals. Regardless, the second signals are node-specific in at least one embodiment, meaning that they may only be measurable if the first node is within wireless communication range of the second node.

The first node then performs one or more timing measurements on one or more second signals that the first node assumes are being transmitted by a node identified by the detected first signals. If the timing measurements are successful, as defined by the measurement results meeting one or more detection verification criteria, such verifies that the detected first signals actually indicated the determined identity and that a node with that identity is within wireless communication range.

In some embodiments, the one or more detection verification criteria enforce one or more requirements on the timing measurement results related to the accuracy or reliability of those measurements. The criteria may, for instance, differentiate timing measurements performed on second signals that exist (because the first node correctly detected a second node within range) from timing measurements performed on signals that do not exist (because the first node incorrectly detected a second node within range), e.g., by defining a threshold that the measurements must meet. Additionally or alternatively, the criteria may reflect a wireless communication coverage area of the second node (e.g., in terms of a maximum timing measurement threshold). In this case, the timing measurement result may verify detection by verifying that the first node is within the potential coverage area of the second node.

In other embodiments, the timing measurement results are used in an identification processing step for determining an identity of the second node, rather than verifying a previously determined identity of the second node. In this case, identification may entail determining an identity of the second node based on the timing measurement results. Such may comprise obtaining a plurality of candidate node identities (e.g., from memory) and performing a plurality of timing measurements based on those identities. If a timing measurement succeeds, as defined by one or more measurement success criteria, the identity on which that measurement was based is determined as belonging to a node within wireless communication range. Regardless, identification then comprises verifying that a node with that identity is in wireless communication range, by verifying that the identity is indicated by one or more signals detected by the first node (which may be different than the signals on which the timing measurements were performed). This may entail, for instance, determining the identity of a node indicated by the one or more signals detected by the first node, and comparing that identity with the identity determined based on the timing measurement results.

Regardless of the particular processing step in which the timing measurement results are used, identification may be complemented by use of conventional signal strength measurements as well. As one example, identification may comprise obtaining the results of one or more signal strength measurements that have been performed by the first node, and further verifying that the detected signals actually indicate the identity of the second node based on the signal strength measurement results.

Figure 13:
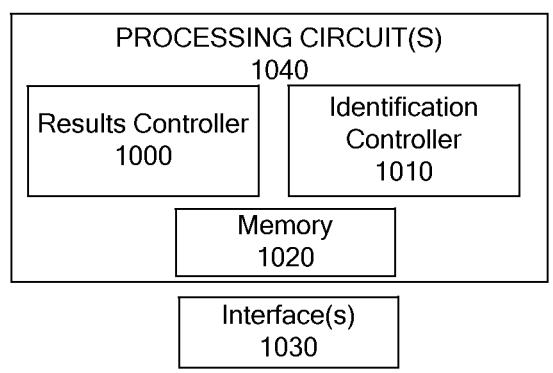
FIG. 13 is a block diagram of a node configured to implement the method of FIG. 12.

FIG. 13 depicts an exemplary node operative to perform the processing shown in FIG. 12. As shown in FIG. 13, the node includes one or more interfaces 1030, and one or more processing circuits 1040. The one or more interfaces 1030 are configured to communicatively couple the node to the wireless communication system, e.g., via an air interface.

The one or more processing circuits 1040 are configured to carry out the processing shown in FIG. 12. The processing circuits 1040 may functionally include a results controller 1000 and an identification controller 1010. The results controller 1000 is configured to obtain the results of one or more timing measurements that have been performed by a first node in the system on one or more signals received by that first node. The identification controller 1010 is configured, based on the timing measurement results obtained by the results controller 1000, to identify a second node having characteristics on which generation of said one or more signals was based as being within wireless communication range of the first node.

Those skilled in the art will of course appreciate that the above figure is simply an example, and that the depicted circuits may be realized, implemented, or otherwise configured within the node, based upon the execution of computer program instructions stored in memory 1020 or within another computer readable medium in the entity.

Figure 14:
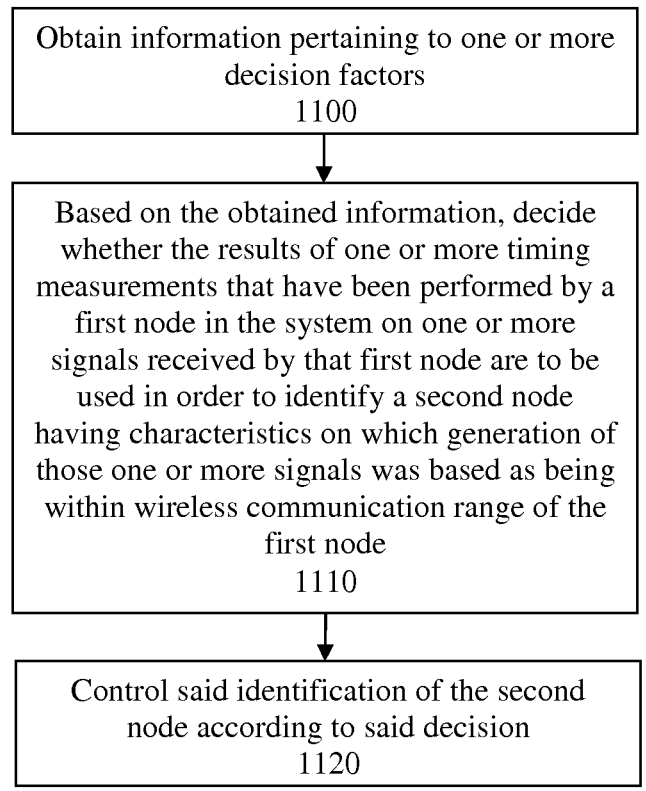
FIG. 14 is a logic flow diagram of a method in a wireless communication system for deciding whether the timing measurement results are to be used for the identification according to one or more embodiments.

One or more other embodiments herein include a method in a wireless communication system for deciding whether the timing measurement results are to be used for the above identification. In particular, and as shown in FIG. 14, the method entails obtaining information pertaining to one or more decision factors (Block 1100). These decision factors may include, for instance, the first node's activity state, the purpose for which identification is being performed, the type of the second node, the availability of using timing measurements, the amount of energy consumed in using the timing measurements, etc.

Regardless, the method further includes, based on the obtained information, deciding whether the results of one or more timing measurements that have been performed by a first node in the system on one or more signals received by that first node are to be used in order to identify a second node having characteristics on which generation of said one or more signals was based as being within wireless communication range of the first node (Block 1110). Finally, the method entails controlling the identification of the second node according to this decision (Block 1120).

In some embodiments, this method is implemented by a node other than the first node. In this case, controlling may comprise requesting that the first node perform the timing measurements, sending assistance data to the first node indicating a type of timing measurement to be performed, or otherwise triggering the identification to be performed with or without use of the timing measurements.

In other embodiments, though, the method is implemented by the first node itself. In this case, controlling may simply entail actually performing identification of the second node according to the decision (i.e., with or without use of timing measurements). This decision may be triggered autonomously by the first node or upon request by a different node.

Figure 15:
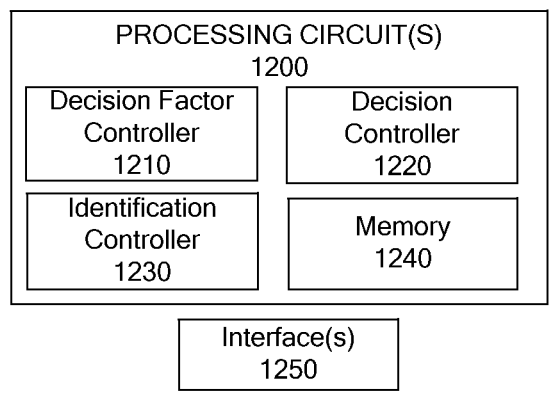
FIG. 15 is a block diagram of a node configured to implement the method of FIG. 14.

FIG. 15 depicts an exemplary node operative to perform the processing shown in FIG. 14. As shown in FIG. 15, the node includes one or more interfaces 1250, and one or more processing circuits 1200. The one or more interfaces 1250 are configured to communicatively couple the node to the wireless communication system, e.g., via an air interface.

The one or more processing circuits 1200 are configured to carry out the processing shown in FIG. 14. The processing circuits 1200 may functionally include a decision factor controller 1210, a decision controller 1220, and an identification controller 1230. The decision factor controller 1210 is configured to obtain information pertaining to one or more decision factors. The decision controller 1220 is configured, based on the obtained information, to decide whether the results of one or more timing measurements are to be used in order to identify the second node as being within range of the first node. And the identification controller 1230 is configured to control the identification of the second node according to this decision.

Those skilled in the art will of course appreciate that the above figure is simply an example, and that the depicted circuits may be realized, implemented, or otherwise configured within the node, based upon the execution of computer program instructions stored in memory 1240 or within another computer readable medium in the entity.

Those skilled in the art will also appreciate that the nodes illustrated in FIG. 13 or 15 may be configured to further use the results of the second node identification. The nodes may, for instance, use the second node identification for mobility of the first node, reading by the first node of system information, positioning of the first node, etc.

Those skilled in the art will further appreciate that the second node described above may be any type of node configured to transmit wireless communication signals, whether those signals are transmitted according to cellular standards, short-range communication standards, or the like. The same can be said of the first node. Moreover, those skilled in the art will appreciate that although the above embodiments were described in the context of identifying a second node within wireless communication range of a first node, such extends to identifying a cell (or other defined coverage area) within wireless communication range of the first node. In a general sense, the node providing that cell or coverage area still has characteristics on which the one or more signals are generated. However, in a more specific sense, it is the cell or coverage area that has such characteristics. For instance, a cell may have a non-unique identity (e.g., a PCI) on which one or more signals (e.g., a CRS) are generated for the one or more timing measurements.

What is claimed is:

1. A method implemented by a node in a wireless communication system, the method comprising:
   by said node, obtaining a result of a timing measurement performed on one or more first radio signals associated with one or more specific characteristics; and
   by said node, verifying one or more second radio signals as associated with the same one or more specific characteristics, by determining whether said result meets one or more conditions.

2. The method of claim 1, wherein a first radio signal is the same as a second radio signal.

3. The method of claim 1, wherein said one or more specific characteristics comprise at least an identity of a specific transmit port number, radio node, or cell.

4. The method of claim 1, wherein said one or more specific characteristics comprise at least one of a code or parameter used for generating the one or more second radio signals.

5. The method of claim 1, wherein the node is a first wireless device and wherein a second wireless device transmits the one or more first radio signals.

6. The method of claim 1, wherein said determining comprises determining that said result meets the one or more conditions when one or more of:
   said result is less than a defined maximum timing threshold, greater than a defined minimum timing threshold, or both; and
   said result corresponds to a distance that is less than a defined maximum distance threshold, greater than a defined minimum distance threshold, or both.

7. The method of claim 1, wherein said determining comprises determining that said result meets the one or more conditions when one or more of:
   said result is determined within a defined time window; and
   said result is a specific time instant relative to a timing of another signal, or relative to an absolute timing instant.

8. The method of claim 1, wherein the timing measurement comprises one or more of:
   a measurement of a time of arrival or time difference of arrival of the one or more first radio signals;
   a measurement of a timing advance associated with the one or more first radio signals;
   a measurement of a round trip time or propagation delay associated with the one or more first radio signals; and
   a correlation of the one or more first radio signals to one or more known signals.

9. The method of claim 8, wherein said determining comprises determining that said result meets the one or more conditions when said result has at least a defined accuracy, reliability, quality, or any combination thereof.

10. The method of claim 1, wherein the one or more first radio signals comprise one or more reference signals.

11. The method of claim 1, wherein the one or more second radio signals comprise one or more synchronization signals.

12. The method of claim 1, further comprising obtaining a result of a power-based measurement, and wherein said verifying comprises verifying the one or more second radio signals as associated with said one or more specific characteristics by determining whether both the result of the timing measurement meets the one or more conditions and the result of the power-based measurement meets one or more other conditions.

13. The method of claim 1, further comprising selecting, from among a plurality of different types of measurements possible for performing verification, the timing measurement as being the type of measurement with the greatest accuracy, with the greatest speed, with the lowest resource consumption, or any combination thereof.

14. The method of claim 1, wherein said verifying is performed as part of identifying a radio node or a cell from which the one or more second radio signal are transmitted.

15. The method of claim 1, wherein said verifying is performed as part of determining the position of a radio node that transmitted or received the one or more second radio signals.

16. The method of claim 1, further comprising signaling to another node a capability associated with an ability of said node to use a timing measurement for verification.

17. The method of claim 1, wherein a first radio signal is different from a second radio signal.

18. The method of claim 1, wherein the wireless communication system is a Long Term Evolution (LTE) system, wherein the one or more second radio signals include a primary synchronization signal (PSS) and a secondary synchronization signal (SSS), the one or more first radio signals include a cell-specific reference signal (CRS), and the one or more specific characteristics include a specific physical cell identity (PCI).

19. A method implemented by a network node in a wireless communication system, the method comprising:
by said network node, determining one or more conditions that a result of a timing measurement performed on one or more first radio signals associated with one or more specific characteristics must meet in order to verify one or more second radio signals as associated with the same one or more specific characteristics; and
by said network node, configuring a node in the wireless communication system to perform said verification in accordance with the one or more conditions.

20. The method of claim 19, wherein determining the one or more conditions comprises determining a defined maximum timing or distance threshold, a defined minimum timing or distance threshold, or both.

21. The method of claim 19, wherein determining the one or more conditions comprises determining a time window within which said result must be determined.

22. The method of claim 19, wherein determining the one or more conditions comprises determining a defined accuracy, reliability, quality, or any combination thereof with which said result must be determined.

23. The method of claim 19, wherein said configuring is performed responsive to receiving a capability associated with an ability of said node to perform verification based on a timing measurement.

24. The method of claim 19, wherein a first radio signal is different from a second radio signal.

25. The method of claim 19, wherein the wireless communication system is a Long Term Evolution (LTE) system, wherein the one or more second radio signals include a primary synchronization signal (PSS) and a secondary synchronization signal (SSS), the one or more first radio signals include a cell-specific reference signal (CRS), and the one or more specific characteristics include a specific physical cell identity (PCI).

26. A node in a wireless communication system, the node comprising one or more communication interfaces configured to communicatively couple the node to the system, and one or more processing circuits configured to:
obtain a result of a timing measurement performed on one or more first radio signals associated with one or more specific characteristics; and
verify one or more second radio signals as associated with the same one or more specific characteristics, by determining whether said result meets one or more conditions.

27. A network node in a wireless communication system, the node comprising one or more communication interfaces configured to communicatively couple the node to the system, and one or more processing circuits configured to:
determine one or more conditions that a result of a timing measurement performed on one or more first radio signals associated with one or more specific characteristics must meet in order to verify one or more second radio signals as associated with the same one or more specific characteristics; and
configure a node in the wireless communication system to perform said verification in accordance with the one or more conditions.

28. A computer program product stored on a non-transitory computer readable medium and comprising program code that, when executed by a node in a wireless communication system, cause the node to:
obtain a result of a timing measurement performed on one or more first radio signals associated with one or more specific characteristics; and
verify one or more second radio signals as associated with the same one or more specific characteristics, by determining whether said result meets one or more conditions.

29. A computer program product stored on a non-transitory computer readable medium and comprising program code that, when executed by a network node in a wireless communication system, cause the network node to:
determine one or more conditions that a result of a timing measurement performed on one or more first radio signals associated with one or more specific characteristics must meet in order to verify one or more second radio signals as associated with the same one or more specific characteristics; and
configure a node in the wireless communication system to perform said verification in accordance with the one or more conditions.

* * * * *